US011076427B2

United States Patent
Tirucherai Muralidharan et al.

(10) Patent No.: US 11,076,427 B2
(45) Date of Patent: Jul. 27, 2021

(54) TECHNIQUES TO HANDLE COLLISIONS BETWEEN UPLINK TRANSMISSIONS AND DOWNLINK TRANSMISSIONS OVER A WIRELESS SPECTRUM

(71) Applicant: QUALCOMM Incorporated, San Diego, CA (US)

(72) Inventors: Vijayvaradharaj Tirucherai Muralidharan, Bangalore (IN); Gowrisankar Somichetty, Bangalore (IN); Shashidhar Vummintala, Bangalore (IN); Vivek Padi, Bangalore (IN); Kapil Bhattad, Bangalore (IN); Alberto Rico Alvarino, San Diego, CA (US); Peng Liu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 16/489,096

(22) PCT Filed: Nov. 21, 2017

(86) PCT No.: PCT/CN2017/112144
§ 371 (c)(1),
(2) Date: Aug. 27, 2019

(87) PCT Pub. No.: WO2018/171233
PCT Pub. Date: Sep. 27, 2018

(65) Prior Publication Data
US 2020/0077442 A1      Mar. 5, 2020

(30) Foreign Application Priority Data
Mar. 20, 2017 (WO) ................ PCT/CN2017/077275

(51) Int. Cl.
*H04W 72/04*    (2009.01)
*H04W 74/08*    (2009.01)
*H04W 74/00*    (2009.01)

(52) U.S. Cl.
CPC ..... *H04W 74/0816* (2013.01); *H04W 72/042* (2013.01); *H04W 74/004* (2013.01)

(58) Field of Classification Search
None
See application file for complete search history.

(56) References Cited

U.S. PATENT DOCUMENTS

| 6,307,846 B1* | 10/2001 | Willey ................. H04W 68/02 370/329 |
| 2013/0235808 A1 | 9/2013 | Earnshaw et al. |
| 2015/0326381 A1* | 11/2015 | Sakhnini ............... H04L 5/0073 370/281 |

(Continued)

FOREIGN PATENT DOCUMENTS

| CN | 103475457 A | 12/2013 |
| WO | WO 2009110716 A2 | 9/2009 |

OTHER PUBLICATIONS

Qualcomm Incorporated; "PUCCH collision in eMTC"; 3GPP TSG RAN WG1 Meeting #88, RI-1702515, Feb. 17, 2017 (Feb. 17, 2017); 3 pgs.

(Continued)

*Primary Examiner* — Scott M Sciacca
(74) *Attorney, Agent, or Firm* — Holland & Hart LLP; Nerrie M. Zohn

(57) ABSTRACT

Techniques are described for handling collisions between uplink transmissions and downlink transmissions over a wireless spectrum. Some of the techniques allow a UE to perform a collision management procedure after identifying a transmission collision (e.g., a collision between a downlink transmission with repetition and an uplink transmission, or a collision between a downlink transmission with repetition and a guard frame for an uplink transmission). The collision management procedure allows the UE to refrain (Continued)

from transmitting at least part of an uplink transmission, refrain from decoding at least part of a downlink transmission, or a combination thereof. Other techniques allow a base station to mitigate transmission collisions by scheduling downlink transmissions based on received, inferred, or determined parameters of uplink transmissions.

30 Claims, 21 Drawing Sheets

(56) References Cited

U.S. PATENT DOCUMENTS

| | | | |
|---|---|---|---|
| 2016/0302218 A1 | 10/2016 | Behravan et al. | |
| 2016/0309500 A1 | 10/2016 | Kim et al. | |
| 2016/0330011 A1* | 11/2016 | Lee | H04L 5/006 |
| 2018/0184434 A1* | 6/2018 | Blankenship | H04L 1/189 |
| 2018/0352582 A1* | 12/2018 | Yl | H04W 72/1257 |

OTHER PUBLICATIONS

Intel Corporation; "On collision handing for reduced processing time operations"; 3GPP TSG-RAN WG1 Meeting #88, RI-1702160, Feb. 17, 2017 (Feb. 17, 2017); 2 pgs.

International Search Report and Written Opinion—PCT/CN2017/077275—ISA/EPO—dated Dec. 13, 2017.

International Search Report and Written Opinion—PCT/CN2017/112144—ISA/EPO—dated Feb. 2, 2018.

Ericsson: "Further LTE Physical Layer Enhancements for MTC", 3GPP TSG RAN Meeting #71, 3GPP Draft; RP-160046, Status Report for Further LTE Physical Layer Enhancements for MTC, 3rd Generation Partnership Project (3GPP), Mobile Competence Centre;650, Route Des Lucioles; F-06921, Sophia-Antipolis Cedex; France, vol. TSG RAN, No. Goteborg, Sweden; Mar. 7, 2016-Mar. 10, 2016, Mar. 1, 2016 (Mar. 1, 2016), XP051656687, Retrieved from the Internet: URL: http://www.3gpp.org/ftpjtsg%5Fran/TSG%5FRAN/TSGR%5F71/Docs/RP%2D160046%2Ezip [retrieved on Mar. 1, 2016], Sections 1-3.

Panasonic: "MTC Resource Collision Handling", 3GPP TSG RAN WG1 Meeting #82b, 3GPP Draft; R1-155333, 3rd Generation Partnership Project (3GPP), Mobile Competence Centre ; 650, Route Des Lucioles ; F-06921 Sophia-Antipolis Cedex ; France, vol. RAN WG1, No. Malmo, Sweden; Oct. 5, 2015-Oct. 9, 2015, Oct. 4, 2015 (Oct. 4, 2015), XP051 039631, Retrieved from the Internet: URL: http://www.3gpp.org/ftp/Meetings_3GPP_SYNC/RAN1/Docs/ [retrieved on Oct. 4, 2015], Sections 1-3.

Supplementary European Search Report—EP17902432—Search Authority—The Hague—dated Nov. 16, 2020.

* cited by examiner

TECHNIQUES TO HANDLE COLLISIONS BETWEEN UPLINK TRANSMISSIONS AND DOWNLINK TRANSMISSIONS OVER A WIRELESS SPECTRUM

CROSS REFERENCES

The present Application is a 371 national phase filing of International Application No. PCT/CN2017/112144 by Tirucherai Muralidharan et al., titled "TECHNIQUES TO HANDLE COLLISIONS BETWEEN UPLINK TRANSMISSIONS AND DOWNLINK TRANSMISSIONS OVER A WIRELESS SPECTRUM", filed Nov. 21, 2017, which claims priority to International Application No. PCT/CN2017/077275 by Tirucherai Muralidharan et al., titled "TECHNIQUES TO HANDLE COLLISIONS BETWEEN UPLINK TRANSMISSIONS AND DOWNLINK TRANSMISSIONS OVER A WIRELESS SPECTRUM", filed Mar. 20, 2017, each of which is assigned to the assignee hereof.

BACKGROUND

The following relates generally to wireless communication, and more specifically to techniques for handling collisions between uplink transmissions and downlink transmissions over a wireless spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In a Long-Term Evolution (LTE) or LTE-Advanced (LTE-A) network, a set of one or more base stations may define an eNodeB (eNB). In a next generation, new radio (NR), 3GPP 5G, or millimeter wave (mmW) network, a base station may take the form of a smart radio head (RH) or access node controller (ANC), with a set of smart radio heads in communication with an ANC defining a gNodeB (gNB). A base station may communicate with a UE on downlink (DL) channels (e.g., for transmissions from the base station to the UE) and uplink (UL) channels (e.g., for transmissions from the UE to the base station).

In some cases, a base station may schedule both uplink and downlink transmissions for a UE. In other cases, a base station may schedule downlink transmissions for a UE, but may only schedule some of the uplink transmissions for the UE. In other cases, a UE may be allocated subframes for periodic and/or triggered uplink transmissions, but the UE may not always use the allocated subframes for the periodic and/or triggered uplink transmissions. Scenarios therefore arise in which a base station may schedule a downlink transmission for a UE in a subframe that the UE intends to use for an uplink transmission, resulting in a collision between the uplink transmission and the downlink transmission.

SUMMARY

The described techniques relate to improved methods, systems, devices, or apparatuses that support techniques for handling collisions between uplink transmissions and downlink transmissions over a wireless spectrum. When a UE is configured for half-duplex frequency division duplexing (FDD) operation and identifies a collision between an uplink transmission and a downlink transmission, the UE may be configured to refrain from transmitting the uplink transmission in favor of receiving the downlink transmission. However, this behavior may not be ideal for the UE under all conditions, and in some cases, a lower-end UE (e.g., a Bandwidth reduced Low complexity (BL) UE or Coverage Enhancement (CE) UE (a BL/CE UE) may not have sufficient or fast enough processing capabilities to comply with such a configuration. Other collision management behaviors are therefore described in the present disclosure. The collision management behaviors may allow a UE to perform a collision management procedure after identifying a collision (e.g., a collision between a downlink transmission with repetition and an uplink transmission, or a collision between a downlink transmission with repetition and a guard frame for an uplink transmission). The collision management procedure may allow the UE to refrain from transmitting at least part of an uplink transmission, refrain from decoding at least part of a downlink transmission, or a combination thereof.

In one example, a method for wireless communication at a UE is described. The method may include receiving a control channel indicating a downlink transmission with repetition in a plurality of subframes; starting an uplink transmission after receiving the control channel; identifying a collision, between the downlink transmission and at least one of the uplink transmission or a guard frame for the uplink transmission, in at least one subframe of the plurality of subframes; and refraining from decoding at least a part of the downlink transmission based at least in part on the identified collision.

In one example, an apparatus for wireless communication at a UE is described. The apparatus may include means for receiving a control channel indicating a downlink transmission with repetition in a plurality of subframes; means for starting an uplink transmission after receiving the control channel; means for identifying a collision, between the downlink transmission and at least one of the uplink transmission or a guard frame for the uplink transmission, in at least one subframe of the plurality of subframes; and means for refraining from decoding at least a part of the downlink transmission based at least in part on the identified collision.

In one example, another apparatus for wireless communication at a UE is described. The apparatus may include a processor, memory in electronic communication with the processor, and instructions stored in the memory and operable, when executed by the processor, to cause the apparatus to receive a control channel indicating a downlink transmission with repetition in a plurality of subframes; start an uplink transmission after receiving the control channel; identify a collision, between the downlink transmission and at least one of the uplink transmission or a guard frame for the uplink transmission, in at least one subframe of the plurality of subframes; and refrain from decoding at least a part of the downlink transmission based at least in part on the identified collision.

In one example, a non-transitory computer readable medium storing code for wireless communication at a UE is described. The code may include instructions executable by a processor to receive a control channel indicating a downlink transmission with repetition in a plurality of subframes; start an uplink transmission after receiving the control channel; identify a collision, between the downlink transmission and at least one of the uplink transmission or a guard frame for the uplink transmission, in at least one subframe of the plurality of subframes; and refrain from decoding at least a part of the downlink transmission based at least in part on the identified collision.

In some examples of the method, apparatus, and non-transitory computer-readable medium described above, the uplink transmission may be started before a start of the downlink transmission.

In some examples of the method, apparatus, and non-transitory computer-readable medium described above, refraining from decoding at least part of the downlink transmission may include: refraining from decoding all of the downlink transmission, or refraining from decoding the downlink transmission in the at least one subframe of the plurality of subframes.

In some examples of the method, apparatus, and non-transitory computer-readable medium described above, the uplink transmission may include a Physical Uplink Control Channel (PUCCH) format 2 transmission, and the downlink transmission may include a Physical Downlink Shared Channel (PDSCH) transmission.

In some examples of the method, apparatus, and non-transitory computer-readable medium described above, the uplink transmission may include at least one of a PUCCH, a Physical Uplink Shared Channel (PUSCH), or a combination thereof, and the downlink transmission may include at least one of a Physical Downlink Shared Channel (PDSCH), a Machine type communication Physical Downlink Control Channel (MPDCCH), or a combination thereof.

In one example, another method for wireless communication at a UE is described. The method may include receiving a control channel indicating a downlink transmission with repetition in a plurality of subframes; identifying a collision, between the downlink transmission and at least one of an uplink transmission or a guard frame for the uplink transmission, in at least one subframe of the plurality of subframes; and performing a collision management procedure based at least in part on the identified collision. The collision management procedure may include refraining from transmitting at least part of the uplink transmission, refraining from decoding at least part of the downlink transmission, or a combination thereof.

In one example, another apparatus for wireless communication at a UE is described. The apparatus may include means for receiving a control channel indicating a downlink transmission with repetition in a plurality of subframes; means for identifying a collision, between the downlink transmission and at least one of an uplink transmission or a guard frame for the uplink transmission, in at least one subframe of the plurality of subframes; and means for performing a collision management procedure based at least in part on the identified collision. The collision management procedure may include refraining from transmitting at least part of the uplink transmission, refraining from decoding at least part of the downlink transmission, or a combination thereof.

In one example, another apparatus for wireless communication at a UE is described. The apparatus may include a processor, memory in electronic communication with the processor, and instructions stored in the memory and operable, when executed by the processor, to cause the apparatus to receive a control channel indicating a downlink transmission with repetition in a plurality of subframes; identify a collision, between the downlink transmission and at least one of an uplink transmission or a guard frame for the uplink transmission, in at least one subframe of the plurality of subframes; and perform a collision management procedure based at least in part on the identified collision. The collision management procedure may include refraining from transmitting at least part of the uplink transmission, refraining from decoding at least part of the downlink transmission, or a combination thereof.

In one example, another non-transitory computer readable medium storing code for wireless communication at a UE is described. The code may include instructions executable by a processor to receive a control channel indicating a downlink transmission with repetition in a plurality of subframes; identify a collision, between the downlink transmission and at least one of an uplink transmission or a guard frame for the uplink transmission, in at least one subframe of the plurality of subframes; and perform a collision management procedure based at least in part on the identified collision. The collision management procedure may include refraining from transmitting at least part of the uplink transmission, refraining from decoding at least part of the downlink transmission, or a combination thereof.

In some examples of the method, apparatus, and non-transitory computer-readable medium described above, performing the collision management procedure may include refraining from decoding at least part of the downlink transmission, and the method, apparatus, and non-transitory computer-readable medium may further include processes, features, means, or instructions for transmitting the uplink transmission in the at least one subframe associated with the identified collision; and decoding the downlink transmission in at least one other subframe that is not associated with the identified collision.

In some examples of the method, apparatus, and non-transitory computer-readable medium described above, performing the collision management procedure may include refraining from decoding the downlink transmission in at least a first subframe of the at least one subframe associated with the identified collision; and refraining from transmitting the uplink transmission in at least a second subframe of the at least one subframe associated with the identified collision. In these examples; the method, apparatus, and non-transitory computer-readable medium may further include processes, features, means, or instructions for transmitting the uplink transmission in at least the first subframe; and decoding the downlink transmission in at least the second subframe.

Some examples of the method, apparatus, and non-transitory computer-readable medium described above may further include processes, features, means, or instructions for determining there is no collision, between the downlink transmission and at least one of the uplink transmission or the guard frame for the uplink transmission, within a set of one or more subframes including or following a subframe in which the control channel is received. In these examples, performing the collision management procedure may include:refraining from transmitting the uplink transmission based at least in part on the determination.

Some examples of the method, apparatus, and non-transitory computer-readable medium described above may further include processes, features, means, or instructions for determining there is no collision, between the downlink transmission and at least one of the uplink transmission or the guard frame for the uplink transmission, within a set of one or more subframes including or following a temporally first subframe in the plurality of subframes associated with the downlink transmission. In these examples, performing the collision management procedure may include refraining from transmitting the uplink transmission based at least in part on the determination.

In some examples of the method, apparatus, and non-transitory computer-readable medium described above, performing the collision management procedure may include prioritizing the uplink transmission after identifying the collision, to transmit the uplink transmission before decoding the downlink transmission in any subframe; and refraining from decoding the downlink transmission in any subframe in which the uplink transmission is transmitted.

In some examples of the method, apparatus, and non-transitory computer-readable medium described above, performing the collision management procedure may include prioritizing the downlink transmission after identifying the collision, to decode the downlink transmission before transmitting the uplink transmission in any subframe; and refraining from transmitting the uplink transmission in any subframe in which the downlink transmission is decoded.

In some examples of the method, apparatus, and non-transitory computer-readable medium described above, performing the collision management procedure may include refraining from decoding any subframe of the downlink transmission until after transmitting all subframes of the uplink transmission; and the method, apparatus, and non-transitory computer-readable medium may further include processes, features, means, or instructions for decoding at least one subframe of the downlink transmission after transmitting all subframes of the uplink transmission.

In some examples of the method, apparatus, and non-transitory computer-readable medium described above, the uplink transmission may include a PUCCH format 2 transmission, and the downlink transmission may include a PDSCH transmission.

In some examples of the method, apparatus, and non-transitory computer-readable medium described above, the uplink transmission may include at least one of a PUCCH, a PUSCH, or a combination thereof, and the downlink transmission may include at least one of a PDSCH, a MPDCCH, or a combination thereof.

In one example, a method for wireless communication at a base station is described. The method may include identifying a parameter of an uplink transmission from a UE; scheduling a downlink transmission with repetition in a plurality of subframes including a temporally first subset of one or more subframes; and performing the downlink transmission according to the scheduling. The scheduling of the downlink transmission in the temporally first subset of one or more subframes may be based at least in part on the parameter of the uplink transmission to avoid a collision with the uplink transmission.

In one example, an apparatus for wireless communication at a base station is described. The apparatus may include means for identifying a parameter of an uplink transmission from a UE; means for scheduling a downlink transmission with repetition in a plurality of subframes including a temporally first subset of one or more subframes; and means for performing the downlink transmission according to the scheduling. The scheduling of the downlink transmission in the temporally first subset of one or more subframes may be based at least in part on the parameter of the uplink transmission to avoid a collision with the uplink transmission.

In one example, another apparatus for wireless communication at a base station is described. The apparatus may include a processor, memory in electronic communication with the processor, and instructions stored in the memory and operable, when executed by the processor, to cause the apparatus to identify a parameter of an uplink transmission from a UE; schedule a downlink transmission with repetition in a plurality of subframes including a temporally first subset of one or more subframes; and perform the downlink transmission according to the scheduling. The scheduling of the downlink transmission in the temporally first subset of one or more subframes may be based at least in part on the parameter of the uplink transmission to avoid a collision with the uplink transmission.

In one example, a non-transitory computer readable medium storing code for wireless communication at a base station is described. The code may include instructions executable by a processor to identify a parameter of an uplink transmission from a UE; schedule a downlink transmission with repetition in a plurality of subframes including a temporally first subset of one or more subframes; and perform the downlink transmission according to the scheduling. The scheduling of the downlink transmission in the temporally first subset of one or more subframes may be based at least in part on the parameter of the uplink transmission to avoid a collision with the uplink transmission.

Some examples of the method, apparatus, and non-transitory computer-readable medium described above may further include processes, features, means, or instructions for selecting a total number of subframes in the plurality of subframes based at least in part on the parameter of the uplink transmission.

In some examples of the method, apparatus, and non-transitory computer-readable medium described above, the parameter of the uplink transmission may include a number of subframes in which the uplink transmission is repeated, and the method, apparatus, and non-transitory computer-readable medium may further include processes, features, means, or instructions for transmitting an indication of the number of subframes to the UE.

Some examples of the method, apparatus, and non-transitory computer-readable medium described above may further include processes, features, means, or instructions for puncturing, based at least in part on the parameter of the uplink transmission, at least one subframe in which the downlink transmission is transmitted.

In some examples of the method, apparatus, and non-transitory computer-readable medium described above, the downlink transmission may be scheduled after the uplink transmission based at least in part on the parameter of the uplink transmission.

In some examples of the method, apparatus, and non-transitory computer-readable medium described above, identifying the parameter of the uplink transmission may include at least one of receiving the parameter from the UE, inferring the parameter from a transmission received from the UE, inferring the parameter from non-receipt of the transmission from the UE, or a combination thereof.

In some examples of the method, apparatus, and non-transitory computer-readable medium described above, the parameter of the uplink transmission may include at least one of: an identifier of at least one subframe in which the uplink transmission is transmitted, a number of subframes in which the uplink transmission is transmitted, a periodicity of the uplink transmission, a duration of the uplink transmission, or a combination thereof.

In some examples of the method, apparatus, and non-transitory computer-readable medium described above, the uplink transmission may include a PUCCH format 2 transmission, and the downlink transmission may include a PDSCH transmission.

In some examples of the method, apparatus, and non-transitory computer-readable medium described above, the uplink transmission may include at least one of a PUCCH, a PUSCH, or a combination thereof, and the downlink transmission may include at least one of a PDSCH, a MPDCCH, or a combination thereof.

DETAILED DESCRIPTION

Techniques are described for handling collisions between uplink transmissions and downlink transmissions over a wireless spectrum. In some examples, the techniques may enable avoidance of a collision. In other examples, the techniques may enable mitigation of the effects of a collision. Collision avoidance and mitigation techniques are described from both UE and base station perspectives.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Aspects of the disclosure are initially described in the context of a wireless communication system. Aspects of the disclosure are further illustrated by and described with reference to a communication timeline, apparatus diagrams, system diagrams, and flowcharts that relate to techniques for handling collisions between uplink transmissions and downlink transmissions over a wireless spectrum.

Figure 1:
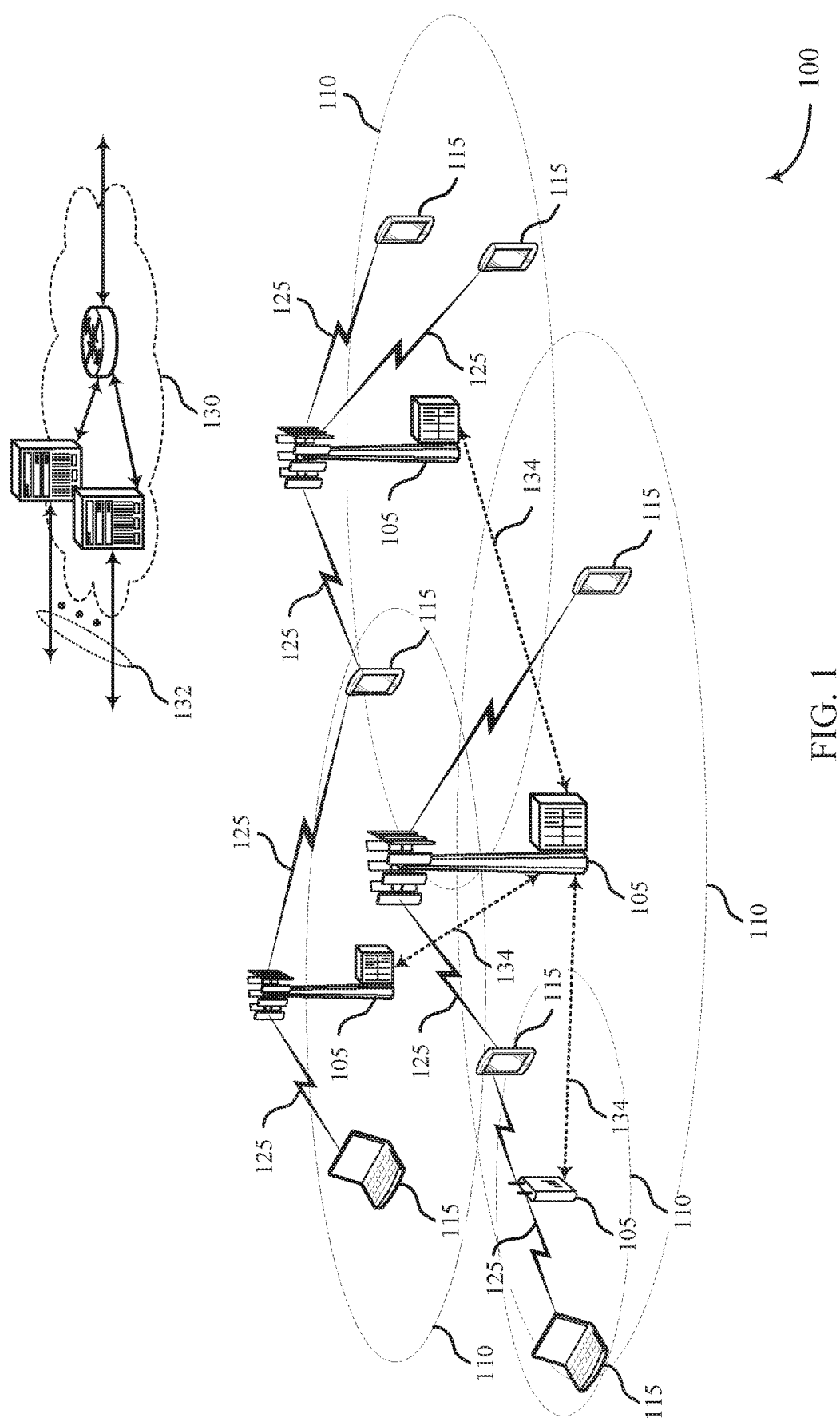
FIG. 1 illustrates an example of wireless communication system in accordance with various aspects of the present disclosure.

FIG. 1 shows an example of a wireless communication system 100, in accordance with various aspects of the present disclosure. The wireless communication system 100 includes base stations 105, UEs 115, and a core network 130. In some examples, the wireless communication system 100 may be an LTE (or LTE-Advanced) network, or an NR network. In some cases, the wireless communication system 100 may support enhanced broadband communications, ultra-reliable (i.e., mission critical) communications, low latency communications, and communications with low-cost and low-complexity devices.

The base stations 105 may wirelessly communicate with UEs 115 via one or more base station antennas. Each base station 105 may provide communication coverage for a respective geographic coverage area 110. The communication links 125 shown in wireless communication system 100 may include uplinks, from a UE 115 to a base station 105, or downlinks, from a base station 105 to a UE 115. Control information and data may be multiplexed on an uplink channel or downlink channel according to various techniques. Control information and data may be multiplexed on a downlink channel, for example, using time division multiplexing (TDM) techniques, frequency division multiplexing (FDM) techniques, or hybrid TDM-FDM techniques.

The UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communication system may be configured to provide ultra-reliable communications for these functions.

The base stations 105 may communicate with the core network 130 and with one another. For example, base stations 105 may interface with the core network 130 through backhaul links 132 (e.g., S1, etc.). The base stations 105 may communicate with one another over backhaul links 134 (e.g., X2, etc.) either directly or indirectly (e.g., through core network 130). The base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network 130 may be an evolved packet core (EPC), which may include at least one mobility management entity (MME), at least one serving gateway (S-GW), and at least one Packet Data Network (PDN) Gateway (P-GW). The MME may be the control node that processes the signaling between the UE 115 and the EPC. All user Internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched Streaming Service (PSS).

The wireless communication system 100 may operate in an ultra-high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, the wireless communication system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless communication systems use a transmission scheme between a transmitter (e.g., a base station 105) and a receiver (e.g., a UE 115), where both transmitter and receiver are equipped with multiple antennas. Some portions of wireless communication system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, the wireless communication system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a core network 130 supporting radio bearers for user plane data. At the Physical (PHY) layer, transport channels may be mapped to physical channels.

Time intervals in LTE or NR may be expressed in multiples of a basic time unit (which may be a sampling period of Ts=1/30,720,000 seconds). Time resources may be organized according to radio frames of length of 10 ms (Tf=307200 Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

In some cases, the wireless communication system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link.). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. A device, such as a UE 115 or base station 105, utilizing eCCs may transmit wideband signals (e.g., 20, 40, 60, 80 MHz, etc.) at reduced symbol durations (e.g., 16.67 microseconds).

In some cases, the wireless communication system 100 may utilize both licensed and unlicensed radio frequency spectrum bands. For example, the wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based at least in part on a CA configuration in conjunction with CCs operating in a licensed band. Operations in unlicensed spectrum may include downlink transmissions, uplink transmissions, or both. Duplexing in unlicensed spectrum may be based at least in part on frequency division duplexing (FDD), time division duplexing (TDD) or a combination of both.

In some examples, transmissions of a base station 105 and UE 115 may collide. For example, a base station 105 may schedule a downlink transmission, for a UE 115, in a same subframe that the UE 115 intends to transmit an uplink transmission.

3GPP TS 36.213 indicates that, in the case of a collision between a Physical Uplink Control Channel (PUCCH) format 2 transmission including half-duplex guard subframe and a Physical Downlink Shared Channel (PDSCH) reception with repetitions, by a BL/CE UE configured for half-duplex FDD operation, the PUCCH format 2 transmission should be dropped. Thus, when a BL/CE UE decodes an MTC Physical Downlink Control Channel (MPDCCH) including a downlink grant for a PDSCH with repetitions, then pursuant to 3GPP TS 36.213, periodic Channel Quality Information (CQI) transmissions that collide with the PDSCH with repetitions need to be dropped. However, if a subframe containing a periodic CQI transmission is within a small number of subframes after the last MPDCCH subframe, the time available between MPDCCH decoding and the decision to keep/drop periodic-CQI is very stringent, and it is difficult for a low cost BL/CE UE to comply with the requirement of 3GPP TS 36.213.

Figure 2:
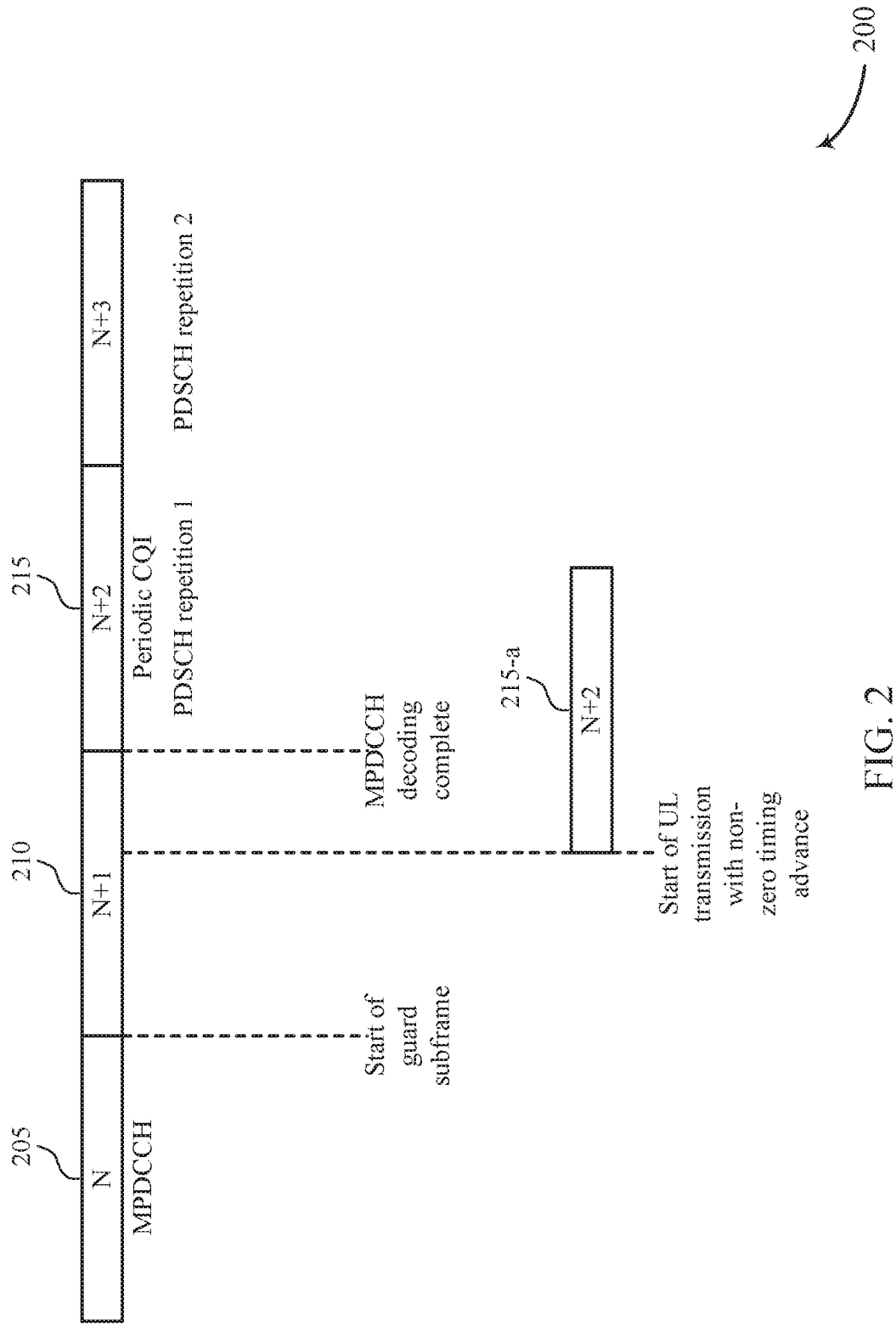
FIG. 2 shows a timeline of communications between a network (e.g., a base station or eNB) and a UE, in accordance with various aspects of the present disclosure.

FIG. 2 shows a timeline 200 of communications between a network (e.g., a base station or eNB) and a UE, in accordance with various aspects of the present disclosure. In some examples, the communications may be between a base station 105 and a UE 115 described with reference to FIG. 1.

As shown in FIG. 2, an MPDCCH may be received by a UE (e.g., a BL/CE UE) during a subframe N (SF_N) 205, and the MPDCCH may indicate the existence of (e.g., schedule) a PDSCH with repetitions beginning in SF_N+2 215. However, the UE may take 0.5 millisecond (ms) to 1.0 ms to decode and detect the existence of the PDSCH with repetitions, so the UE may not identify the existence of the PDSCH with repetitions until SF_N+1 210. Assuming the UE has a preconfigured PUCCH report for SF_N+2 215, the UE may have marked SF_N+1 210 as a guard subframe, and marked SF_N+2 215 as an UL subframe. In some examples, the UE may discard the PUCCH reporting in SF_N+2 215 upon identifying a collision between the PUCCH report and the PDSCH with repetitions in SF_N+2 215. However, by the time the UE identifies the existence of the PDSCH with repetitions and determines a need to discard the PUCCH reporting in SF_N+2 215, the UL transmission in SF_N+2 215 may already have started (e.g., in the case of SF_N+2 215-a being associated with a non-zero timing advance), and a collision may occur—especially if SF_N-+2 215-a is associated with a non-zero timing advance.

To address the type of collision scenario described with reference to FIG. 2, a UE may determine not to decode a PDSCH with repetitions if at least one of the repetitions collides with a scheduled PUCCH format 2 transmission and/or a corresponding guard subframe (e.g., a UE may be allowed to drop the PDSCH with repetitions when the UE identifies a collision between a repetition of the PDSCH and a scheduled PUCCH format 2 transmission).

Also or alternatively, a UE may not use a subframe (or subframes) in which a PDSCH with repetitions collides with a scheduled PUCCH format 2 transmission (and/or corresponding guard subframes) for decoding the PDSCH with repetitions, though the UE may use a subframe (or subframes) in which a PDSCH with repetitions does not collide with a scheduled PUCCH format 2 transmission for decoding the PDSCH with repetitions (e.g., a UE may be allowed to drop portions of a PDSCH that collide with a scheduled PUCCH format 2 transmission and transmit the scheduled PUCCH format 2 transmission).

Also or alternatively, when a UE has a scheduled PUCCH transmission that needs to be transmitted over more than one subframe, and when the UE identifies a collision between the scheduled PUCCH transmission and a PDSCH with repetitions, the UE may drop part of the scheduled PUCCH transmission in order to monitor more PDSCH subframes (e.g., the UE may partially transmit the scheduled PUCCH and partially monitor the PDSCH). In some examples, the number of subframes in which the scheduled PUCCH transmission is dropped may depend on the number of subframes that include PDSCH repetitions.

Also or alternatively, when the MPDCCH indicates the existence of a PDSCH with repetitions, a UE may be mandated to monitor all repetitions of the PDSCH when there are no scheduled PUCCH format 2 transmissions in the first "x" subframes after a subframe in which the MPDCCH is received. In other words, a scheduled PUCCH format 2 transmission may be dropped for all repetitions of a PDSCH when a UE does not identify a collision between the scheduled PUCCH format 2 transmission and a repetition of the PDSCH in the first "x" subframes. If a collision is identified to occur within the first "x" subframes, one of the three solutions discussed above for handling the collision may be used. That is, the UE may transmit an entire scheduled PUCCH format 2 transmission and drop monitoring of the PDSCH with repetitions; transmit an entire scheduled PUCCH format 2 transmission and monitor the PDSCH in one or more subframes in which a collision with a scheduled. PUCCH format 2 transmission is not identified; or transmit a portion of a scheduled PUCCH format 2 transmission and monitor at least one repetition of the PDSCH. For example, if a collision is identified to occur within the first "x" subframes with the scheduled PUCCH transmission with repetitions spanning multiple subframes some of which are within the first "x" subframes and some of which are after the first "x" subframes, a UE may be mandated to monitor those repetitions of PDSCH which occur after the first "x" subframes. In some alternatives, the first "x" subframes may not be the first "x" subframes after the subframe in which the MPDCCH is received, but instead may be the first "x" subframes including repetitions of the PDSCH, or the first "x" subframes after a subframe in which a first repetition of the PDSCH is scheduled. In some examples, "x" may be any integer greater than or equal to 1.

Also or alternatively, a UE may be allowed to drop the entirety of a scheduled PUCCH transmission that collides with a PDSCH with repetitions. However, this may not be achievable when the collision happens in a subframe that is too close to a subframe in which a MPDCCH is received, and when the UE cannot identify the collision before the scheduled PUCCH transmission begins.

Also or alternatively, a UP may prioritize PUCCH format 2 transmissions in the case of a collision with a PDSCH repetition within "x" subframes, so that a base station (e.g., an eNB) is incentivized to avoid such cases and knows the UE's behavior precisely. The base station can then skip transmitting repetitions of a PDSCH on the subframes in which the base station knows the UE will transmit a scheduled PUCCH format 2 transmission. Alternatively, the base station may postpone a first PDSCH repetition until the end of the UE's scheduled PUCCH format 2 transmission.

Also or alternatively, a UE may choose to transmit an entire scheduled PUCCH format 2 transmission before monitoring for a PDSCH with repetitions, or may switch to monitoring the PDSCH as soon as it can so that it can receive at least a few portions of the PDSCH.

Depending on the timing of an identified collision between a scheduled PUCCH format 2 transmission and a PDSCH repetition, a UE may employ a combination of the above described techniques for addressing such a collision.

In some examples, a subframe in which a UE is not monitoring for a PDSCH repetition may be used for a scheduled PUCCH format 2 transmission and/or a guard subframe. The preceding paragraphs have primarily described techniques for addressing the type of collision scenario described with reference to FIG. 2 from the UE side. The type of collision scenario described with reference to FIG. 2 may also or alternatively be addressed from the network side (e.g., a base station or eNB side).

In some examples, the network (e.g., a base station or eNB) may ensure that PUCCH format 2 subframes of a UE do not collide with subframes in which a PDSCH with repetitions is scheduled. This may be achieved by appropriately scheduling the PDSCH with repetitions and/or configuring or scheduling the PUCCH format 2 subframes. Also or alternatively, a network may ensure that PUCCH format 2 subframes do not collide with the first "y" subframes of a PDSCH with repetitions. Also or alternatively, a network may increase the number of subframes used for a PDSCH with repetitions (i.e., increase the number of PDSCH repetitions) to account for a loss of subframes that overlap with a UE's PUCCH format 2 subframes and/or guard subframes. Also or alternatively, a network may allocate larger (or more) PUCCH format 2 repetitions to account for a loss of subframes that overlap subframes with PDSCH repetitions. Also or alternatively, a network may puncture some or all PDSCH subframes to allow for a UE's PUCCH format 2 transmissions. Also or alternatively, a network may postpone transmission of a PDSCH with repetition when there may be an overlap with a scheduled PUCCH format 2 transmission of a UE.

In some examples, the techniques described herein for addressing the collision scenario described with reference to FIG. 2 may be used to address other collision scenarios (e.g., other UL/DL collision scenarios), such as: collisions between a PUCCH acknowledgement (ACK), non-acknowledgement (NACK), scheduling request (SR) and a PDSCH; collisions between a Physical Uplink Shared Channel (PUSCH) and a PDSCH; collisions between a PUCCH ACK/NACK/SR and a MPDCCH, collisions between a PUSCH and a MPDCCH; or collisions between CQI reporting through a PUSCH and a PDSCH (or MPDCCH).

Although the previous examples are described with reference to a set of "p" subframes, the "p" subframes may in some cases be "p" valid DL/UL subframes.

Figure 3:
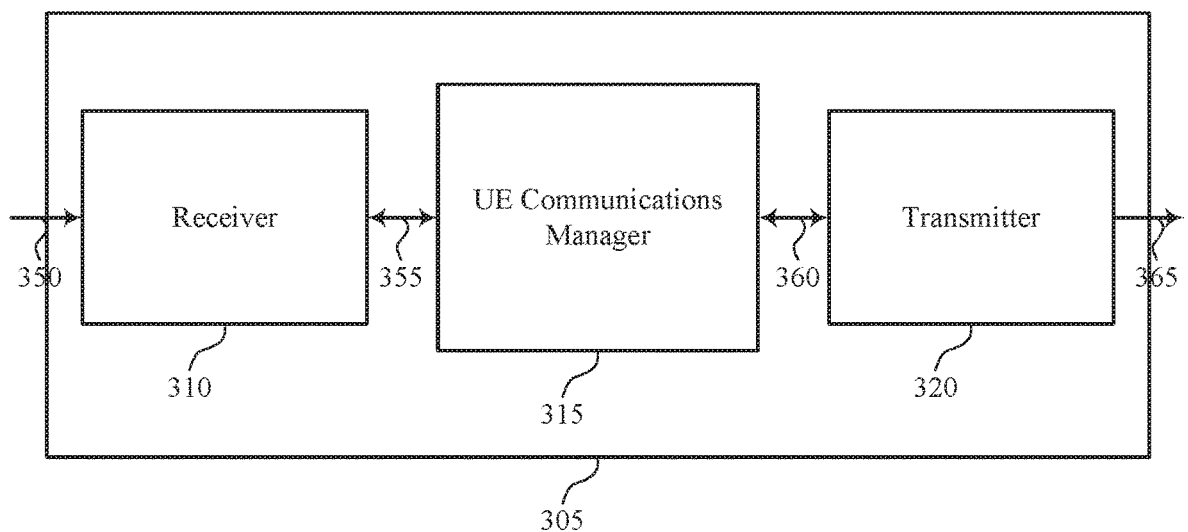
FIGS. 3 through 5 show block diagrams of a wireless device that supports techniques for handling collisions between uplink transmissions and downlink transmissions over a wireless spectrum in accordance with aspects of the present disclosure.

FIG. 3 shows a block diagram 300 of a wireless device 305 that supports techniques for handling collisions between uplink transmissions and downlink transmissions over a wireless spectrum in accordance with aspects of the present disclosure. The wireless device 305 may be an example of aspects of a UE 115 as described with reference to FIG. 1. The wireless device 305 may include a receiver 310, a UE communications manager 315, and a transmitter 320. The wireless device 305 may also include a processor. Each of these components may be in communication with one another (e.g., via one or more buses).

The receiver 310 may receive data or control signals or information (i.e., transmissions 350), some or all of which may be associated with various information channels (e.g., data channels, control channels, etc.). Received signals or information, or measurements performed thereon (e.g., signals or information 355), may be passed to other components of the wireless device 305. Transmissions 350 and signals or information 355 may be signals or information such as a control channel indicating a downlink transmission with repetition in a plurality of subframes. The receiver 310 may include a single antenna or a set of antennas.

The UE communications manager 315 may be an example of aspects of the UE communications manager 615 described with reference to FIG. 6.

The UE communications manager 315 and/or at least some of its various sub-components may be implemented in hardware, software executed by a processor, firmware, or any combination thereof. If implemented in software executed by a processor, the functions of the UE communications manager 315 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

In some cases, the UE communications manager 315 and/or at least some of its various sub-components may be physically located at various positions, including being distributed such that portions of functions are implemented at different physical locations by one or more physical devices. In some examples, UE communications manager 315 and/or at least some of its various sub-components may be a separate and distinct component in accordance with various aspects of the present disclosure. In other examples, UE communications manager 315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some examples, the UE communications manager 315 may be used to receive a control channel indicating a downlink transmission with repetition in a set of subframes, start an uplink transmission after receiving the control channel, identify a collision between the downlink transmission and at least one of the uplink transmission or a guard frame for the uplink transmission, and refrain from decoding at least a part of the downlink transmission based at least in part of the identified collision. The collision may occur in at least one subframe of the plurality of subframes in which the downlink transmission is to be received. In some examples, the uplink transmission may be started before a start of the downlink transmission or within a first few subframes of the downlink transmission.

In some examples, the UE communications manager 315 may be used to receive a control channel indicating a downlink transmission with repetition in a set of subframes, identify a collision between the downlink transmission and at least one of a scheduled uplink transmission or a guard frame for the scheduled uplink transmission, perform a collision management procedure based at least in part on the identified collision. The collision may occur in at least one subframe of the plurality of subframes in which the downlink transmission is to be received. The collision management procedure may include refraining from transmitting at least part of the scheduled uplink transmission, refraining from decoding at least part of the downlink transmission, or a combination thereof.

The transmitter 320 may receive and transmit data or control signals or information (i.e., transmissions 360, 365) generated by other components of the wireless device 305, some or all of which may be associated with various information channels (e.g., data channels, control channels, etc.). Transmissions 360 and 365 may be signals or information such as uplink transmissions described above. In some examples, the uplink transmission may include at least one of a PUCCH, a PUSCH, or a combination thereof. In some examples, the transmitter 320 may be collocated with the receiver 310 in a transceiver. For example, the transmitter 320 and receiver 310 may be an example of aspects of the transceiver 635 described with reference to FIG. 6. The transmitter 320 may include a single antenna or a set of antennas.

Figure 4:
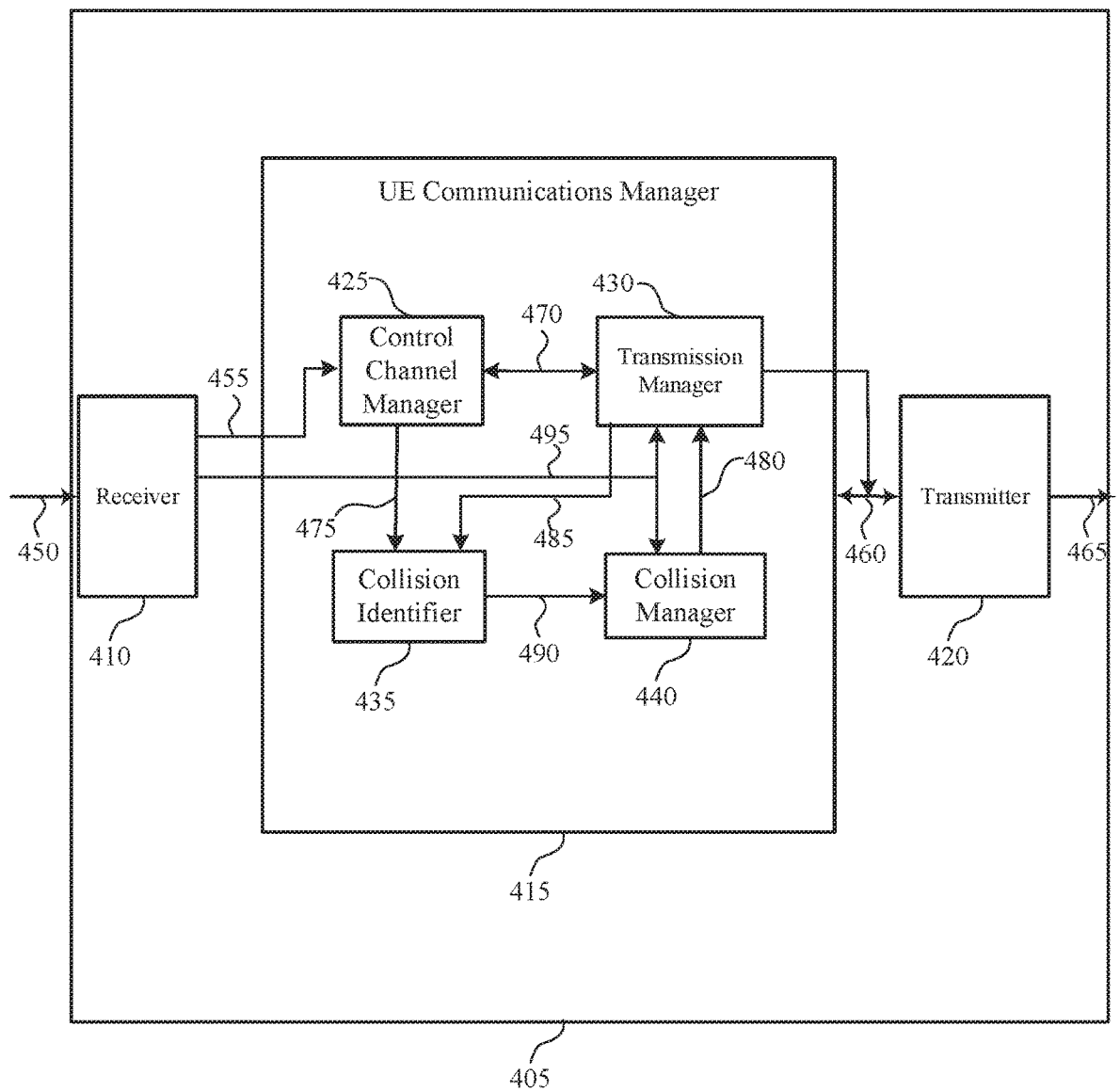

FIG. 4 shows a block diagram 400 of a wireless device 405 that supports techniques for handling collisions between uplink transmissions and downlink transmissions over a wireless spectrum in accordance with aspects of the present disclosure. The wireless device 405 may be an example of aspects of a wireless device 305 or a UE 115 as described with reference to FIGS. 1 and 3. The wireless device 405 may include a receiver 410, a UE communications manager 415, and a transmitter 420. The wireless device 405 may also include a processor. Each of these components may be in communication with one another (e.g., via one or more buses).

The receiver 410 may receive data or control signals or information via transmissions 450, some or all of which may be associated with various information channels (e.g., data channels, control channels, etc.). Received signals or information, or measurements performed thereon may be passed to other components of the wireless device 405. For example, the receiver 410 may process signals and pass control channel 455 to control channel manager 425 and downlink transmissions 495 to collision manager 440 and transmission manager 430. The receiver 410 may include a single antenna or a set of antennas.

The UE communications manager 415 may be an example of aspects of the UE communications manager 315 or 615 described with reference to FIG. 3 or 6. The UE communications manager 415 may include a control channel manager 425, a transmission manager 430, a collision identifier 435, and a collision manager 440.

In some examples, the control channel manager 425 may receive a control channel 455 indicating a downlink transmission with repetition in a set of subframes, and the transmission manager 430 may be used to start an uplink transmission (e.g., transmissions 460) after receiving the control channel information 470. In some examples, the uplink transmission may be started before a start of the downlink transmission or within a first few subframes of the downlink transmission. The collision identifier 435 may receive downlink transmission information 475 and uplink transmission information 485. The collision identifier 435 may be used to identify a collision between the downlink transmission and at least one of the scheduled uplink transmission or a guard frame for the scheduled uplink transmission. The collision may occur in at least one subframe of the plurality of subframes in which the downlink transmission is to be received.

The collision manager 440 may receive collision information 490 from collision identifier 435. The collision manager 440 may be used to perform a collision management procedure based at least in part on the identified collision. The collision management procedure may include refraining from transmitting at least part of the scheduled uplink transmission 460, refraining from decoding at least part of the downlink transmission 495, or a combination thereof. For example, the collision manager 440 may indicate collision information 480 to the transmission manager 430, which may indicate that a collision is identified to occur within the first "x" subframes after an MPDCCH is received. In this instance, one of the three solutions discussed above for handling the collision may be used. That is, the collision manager 440 may indicate to transmission manager 430 to transmit the entire scheduled uplink transmission 460 and drop monitoring of the downlink transmission 495 with repetitions; transmit the entire scheduled uplink transmission 460 and monitor the downlink transmission 495 in one or more subframes in which a collision with the scheduled uplink transmission 460 is not identified; or transmit a portion of the scheduled uplink transmission 460 and monitor at least one repetition of the downlink transmission 495. For example, the scheduled uplink transmission 460 may include a first set of subframes of the scheduled uplink transmission 460 that collide with the downlink transmission 495 that occur prior to a predetermined number "x" of subframes following the MPDCCH and a second set of subframes that collide with the downlink transmission 495 that are subsequent to the predetermined number "x" of subframes following the MPDCCH. The collision manager 440 may determine to decode the downlink transmission 495 received on the second set of subframes and refrain from transmitting at least part of the scheduled uplink transmission 460 on the second set of subframes.

In some examples, the uplink transmission 460 may include at least one of a PUCCH, a PUSCH, or a combination thereof, and the downlink transmission 495 may include at least one of a PDSCH, a MPDCCH, or a combination thereof. For example, the uplink transmission 460 may include a PUCCH format 2 transmission, and the downlink transmission 495 may include a PDSCH transmission.

The transmitter 420 may receive and transmit data or control signals or information (i.e., transmissions 460) generated by other components of the wireless device 405, some or all of which may be associated with various information channels (e.g., data channels, control channels, etc.). Transmissions 460 may be signals or information such as uplink transmissions described above, and may be transmitted as uplink signals 465. In some examples, the transmitter 420 may be collocated with the receiver 410 in a transceiver. For example, the transmitter 420 and receiver 410 may be an example of aspects of the transceiver 635 described with reference to FIG. 6. The transmitter 420 may include a single antenna or a set of antennas.

Figure 5:
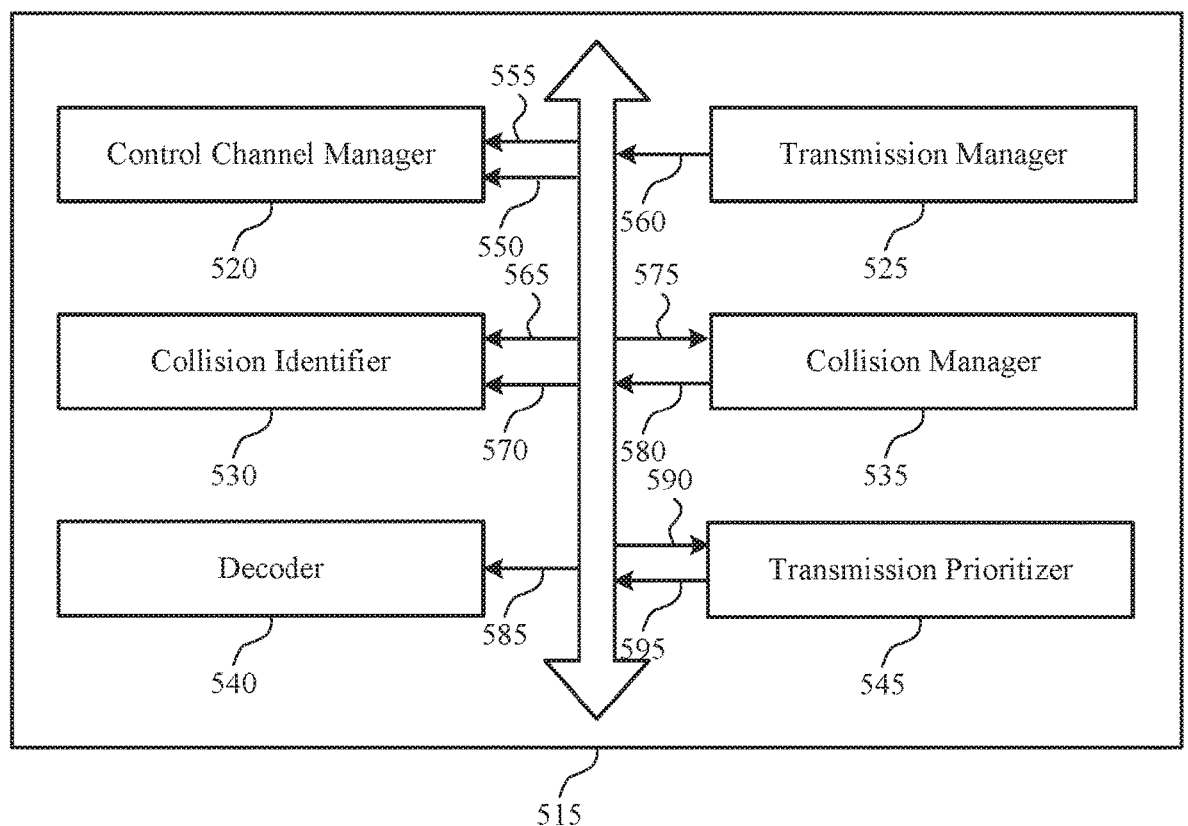

FIG. 5 shows a block diagram 500 of a UE communications manager 515 that supports techniques for handling collisions between uplink transmissions and downlink transmissions over a wireless spectrum in accordance with aspects of the present disclosure. The UE communications manager 515 may be an example of aspects of the UE communications manager 315, 415, or 615 described with reference to FIGS. 3, 4, and 6. The UE communications manager 515 may include a control channel manager 520, a transmission manager 525, a collision identifier 530, a collision manager 535, decoder 540, and/or a transmission prioritizer 545. Each of these components may communicate, directly or indirectly, with one another (e.g., via one or more buses).

The control channel manager 520, transmission manager 525, collision identifier 530, and collision manager 535 may be used to perform some or all of the respective functions of the control channel manager 425, transmission manager 430, collision identifier 435, and collision manager 440 described with reference to FIG. 4, and in some cases may perform one or more of the additional functions described below.

In some examples, the control channel manager 520 may receive downlink transmission information 550 and uplink transmission information 555 and determine that a scheduled uplink transmission comprises more than one subframe and may determine an amount of subframes utilized for downlink transmission. The transmission manager 525 may be used to transmit a scheduled uplink transmission 560 in at least one subframe associated with an identified collision. In some examples, the transmission manager 525 may be used to transmit the scheduled uplink transmission 560 in at least the first subframe (e.g., in the first subframe or in a first few subframes prior to a predetermined number of subframes from a control channel transmission).

In some examples, the collision identifier 530 may receive downlink transmission information 565 and uplink transmission information 570 and determine collisions between a downlink transmission and at least one of an uplink transmission or a guard frame within a set of one or more subframes including or following a subframe in which a control channel is received, and the collision manager 535 may be used to refrain from transmitting the uplink transmission information 580 based at least in part on the determination.

In some examples, the collision identifier 530 may be used to determine there is no collision within a set of one or more subframes including, or following a temporally first subframe in a plurality of subframes associated with a downlink transmission, and the collision manager 535 may indicate to the collision manager 535 via uplink transmission information 580 to refrain from transmitting the uplink transmission 560 based at least in part on the determination.

In some examples, the collision identifier 530 may indicate that a collision is identified to occur within the first "x" subframes after a control channel transmission is received that is associated with a downlink transmission. In this instance, one of the three solutions discussed above for handling the collision may be used. That is, the collision manager 535 may indicate to transmission manager 525 to transmit the entire scheduled uplink transmission and drop monitoring the downlink transmission; transmit the entire scheduled uplink transmission and monitor the downlink transmission in one or more subframes in which a collision with the scheduled uplink transmission is not identified; or transmit a portion of the scheduled uplink transmission and monitor at least one repetition of the downlink transmission. For example, the scheduled uplink transmission may include a first set of subframes of the scheduled uplink transmission that collide with the downlink transmission that occur prior to a predetermined number "x" of subframes following the control channel and a second set of subframes that collide with the downlink transmission that are subsequent to the predetermined number "x" of subframes following the control channel. The collision manager 535 may indicate to the decoder 540 to decode the downlink transmission received on the second set of subframes and refrain from transmitting at least part of the scheduled uplink transmission on the second set of subframes.

The decoder 540 may be used to decode one or more subframes of a downlink transmission 585. In these examples, the decoder 540 may be used to decode the downlink transmission 585 in at least one other subframe that is not associated with the identified collision. The decoder 540 may be used to decode the downlink transmission 585 in at least the second subframe (e.g., in the first subframe or in a first few subframes).

In some examples, the transmission prioritizer 545 may be used to prioritize a scheduled uplink transmission information 595 after identifying a collision, to transmit scheduled uplink transmission information 595 before decoding a downlink transmission information 590 in any subframe, and to refrain from decoding the downlink transmission information 590 in any subframe in which scheduled uplink transmission information 595 is transmitted.

In some examples, the transmission prioritizer 545 may be used to prioritize a downlink transmission information 590 after identifying a collision, to decode the downlink transmission information 590 before transmitting scheduled uplink transmission information 595 in any subframe, and to refrain from transmitting scheduled uplink transmission information 595 in any subframe in which downlink transmission information 590 is transmitted.

Figure 6:
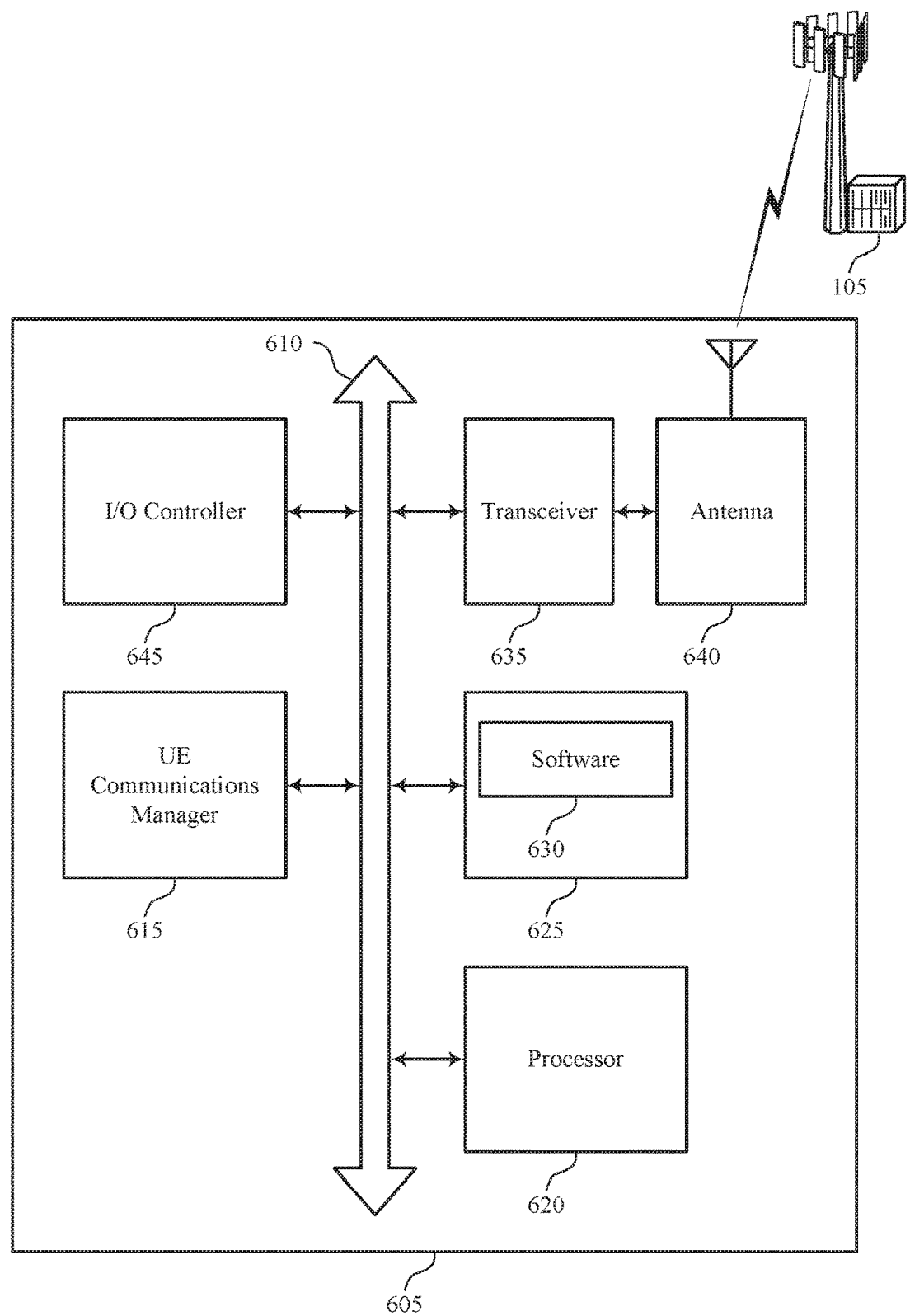
FIG. 6 illustrates a block diagram of a system including a UE that supports techniques for handling collisions between uplink transmissions and downlink transmissions over a wireless spectrum in accordance with aspects of the present disclosure.

FIG. 6 shows a diagram of a system 600 including a device 605 that supports techniques for handling collisions between uplink transmissions and downlink transmissions over a wireless spectrum in accordance with aspects of the present disclosure. The device 605 may be an example of or include the components of a UE 115 or wireless device 305 or 405 described with reference to FIG. 1, 3, or 4. The device 605 may include components for bi-directional voice and data communications, including components for transmitting and receiving communications. The device 605 may include a UE communications manager 615, a processor 620, a memory 625, software 630, a transceiver 635, an antenna 640, and an I/O controller 645. These components may be in electronic communication via one or more busses (e.g., bus 610). The device 605 may communicate wirelessly with one or more base stations 105.

The processor 620 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 620 may be configured to operate a memory array using a memory controller. In other cases, a memory controller may be integrated into the processor 620. The processor 620 may be configured to execute computer-readable instructions stored in a memory to perform various functions (e.g., functions or tasks supporting techniques for handling collisions between uplink transmissions and downlink transmissions over a wireless spectrum).

The memory 625 may include random access memory (RAM) and read only memory (ROM). The memory 625 may store computer-readable, computer-executable software 630 including instructions that, when executed, cause the processor to perform various functions described herein. In some cases, the memory 625 may contain, among other things, a basic input/output system (BIOS) which may control basic hardware and/or software operation such as the interaction with peripheral components or devices.

The software 630 may include code to implement aspects of the present disclosure, including code to support techniques for handling collisions between uplink transmissions and downlink transmissions over a wireless spectrum. The software 630 may be stored in a non-transitory computer-readable medium such as system memory or other memory. In some cases, the software 630 may not be directly executable by the processor but may cause a computer (e.g., when compiled and executed) to perform functions described herein.

The transceiver 635 may communicate bi-directionally, via one or more antennas, wired, or wireless links as described above. For example, the transceiver 635 may represent a wireless transceiver and may communicate bi-directionally with another wireless transceiver. The transceiver 635 may also include a modem to modulate the packets and provide the modulated packets to the antennas for transmission, and to demodulate packets received from the antennas.

In some cases, the device 605 may include a single antenna 640. However, in some cases the device 605 may have more than one antenna 640, which may be capable of concurrently transmitting or receiving multiple wireless transmissions.

The I/O controller 645 may manage input and output signals for device 605. The I/O controller 645 may also manage peripherals not integrated into the device 605. In some cases, the I/O controller 645 may represent a physical connection or port to an external peripheral. In some cases, the I/O controller 645 may utilize an operating system such as iOS®, ANDROID®, MS-DOS®, MS-WINDOWS®, OS/2®, UNIX®, LINUX®, or another known operating system. In other cases, the I/O controller 645 may represent or interact with a modem, a keyboard, a mouse, a touchscreen, or a similar device. In some cases, the I/O controller 645 may be implemented as part of a processor. In some cases, a user may interact with the device 605 via the I/O controller 645 or via hardware components controlled by the I/O controller 645.

Figure 7:
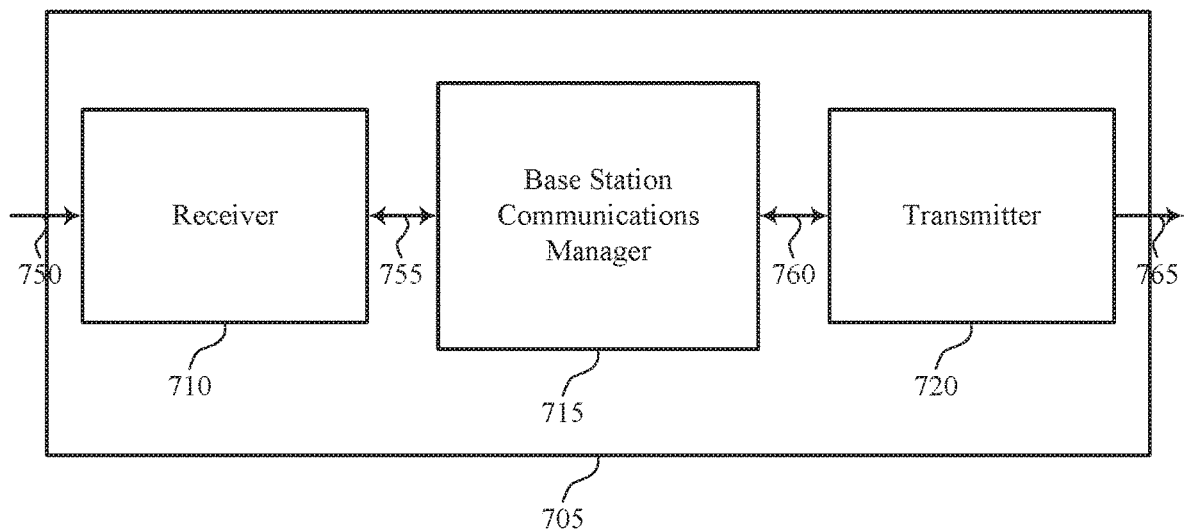
FIGS. 7 through 9 show block diagrams of a wireless device that supports techniques for handling collisions between uplink transmissions and downlink transmissions over a wireless spectrum in accordance with aspects of the present disclosure.

FIG. 7 shows a block diagram 700 of a wireless device 705 that supports techniques for handling collisions between uplink transmissions and downlink transmissions over a wireless spectrum in accordance with aspects of the present disclosure. The wireless device 705 may be an example of aspects of a base station 105 as described with reference to FIG. 1. The wireless device 705 may include a receiver 710, a base station communications manager 715, and a transmitter 720. The wireless device 705 may also include a processor. Each of these components may be in communication with one another (e.g., via one or more buses).

The receiver 710 may receive data or control signals or information (i.e., transmissions 750), some or all of which may be associated with various information channels (e.g., data channels, control channels, etc.). Received signals or information, or measurements performed thereon (e.g., signals or information 755), may be passed to other components of the wireless device 705. Transmissions 750 and signals or information 755 may be signals or information such as a parameter of a scheduled uplink transmission from a UE. In some examples, the parameter of the scheduled uplink transmission may include at least one of: an identifier of at least one subframe in which the scheduled uplink transmission is transmitted, a number of subframes in which the scheduled uplink transmission is transmitted, a periodicity of the scheduled uplink transmission, a duration of the scheduled uplink transmission, or a combination thereof. The receiver 710 may include a single antenna or a set of antennas.

The base station communications manager 715 may be an example of aspects of the base station communications manager 1015 described with reference to FIG. 10.

The base station communications manager 715 and/or at least some of its various sub-components may be implemented in hardware, software executed by a processor, firmware, or any combination thereof. If implemented in software executed by a processor, the functions of the base station communications manager 715 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 715 and/or at least some of its various sub-components may be physically located at various positions, including being distributed such that portions of functions are implemented at different physical locations by one or more physical devices. In some examples, base station communications manager 715 and/or at least some of its various sub-components may be a separate and distinct component in accordance with various aspects of the present disclosure. In other examples, base station communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some examples, the base station communications manager 715 may be used to identify a parameter of a scheduled uplink transmission from a UE, schedule a downlink transmission with repetition in a plurality of subframes including a temporally first subset of one or more subframes, and perform the downlink transmission according to the scheduling. The downlink transmission may be scheduled in the temporally first subset of one or more subframes based at least in part on the parameter of the scheduled uplink transmission to avoid a collision with the scheduled uplink transmission.

The transmitter 720 may receive and transmit data or control signals or information (i.e., transmissions 760, 765) generated by other components of the wireless device 705, some or all of which may be associated with various information channels (e.g., data channels, control channels, etc.). Transmissions 760 and 765 may be signals or information such as scheduling information for a downlink transmission with repetition in a plurality of subframes based at least in part on a parameter of a scheduled uplink transmission. In some examples, the transmitter 720 may be collocated with the receiver 710 in a transceiver. For example, the transmitter 720 and receiver 710 may be an example of aspects of the transceiver 1035 described with reference to FIG. 10. The transmitter 720 may include a single antenna or a set of antennas.

Figure 8:
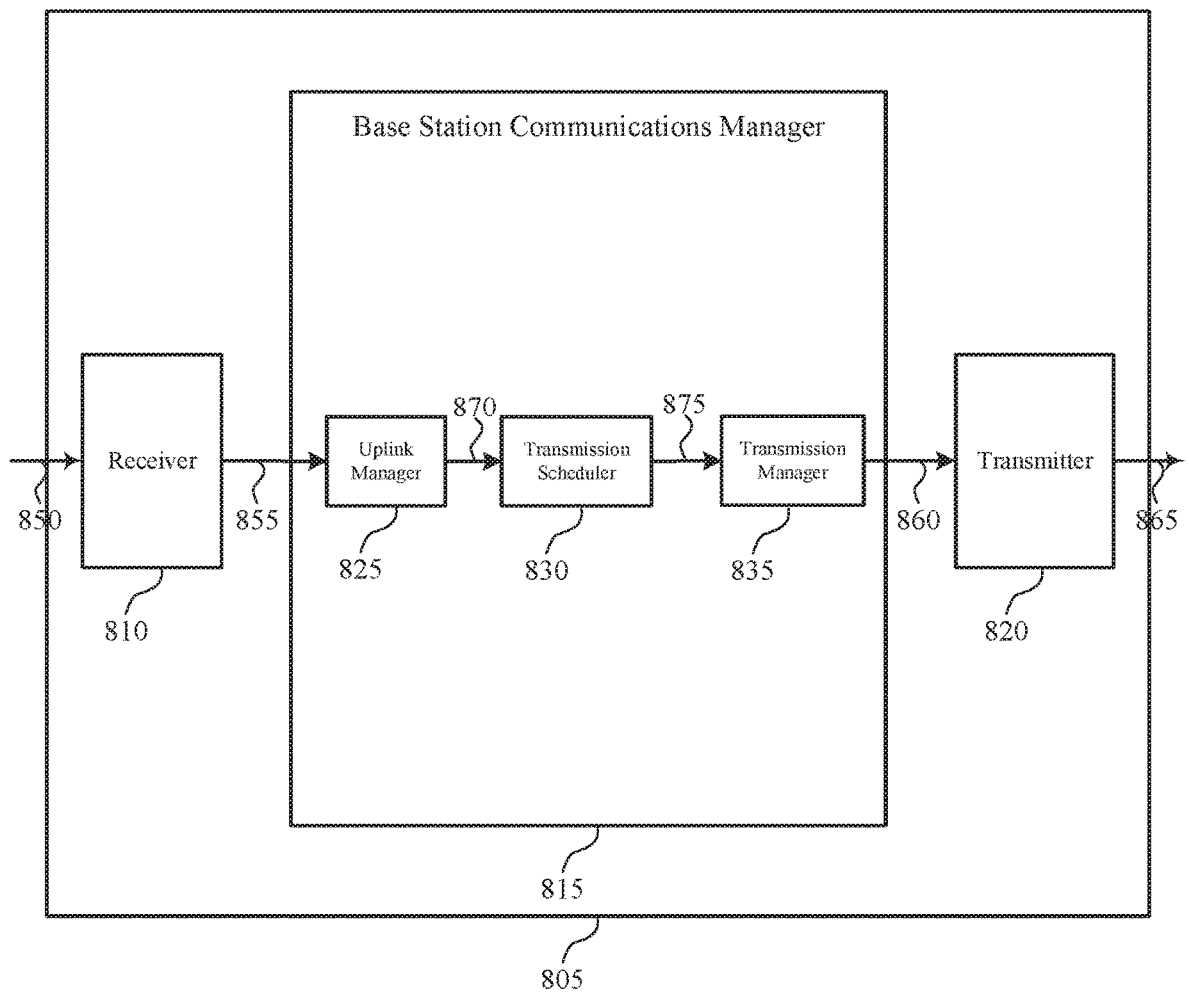

FIG. 8 shows a block diagram 800 of a wireless device 805 that supports techniques for handling collisions between uplink transmissions and downlink transmissions over a wireless spectrum in accordance with aspects of the present disclosure. The wireless device 805 may be an example of aspects of a wireless device 705 or a base station 105 as described with reference to FIGS. 1 and 7. The wireless device 805 may include a receiver 810, a base station communications manager 815, and a transmitter 820. The wireless device 805 may also include a processor. Each of these components may be in communication with one another (e.g., via one or more buses).

The receiver 810 may receive data or control signals or information (i.e., transmissions 850), some or all of which may be associated with various information channels (e.g., data channels, control channels, etc.). Received signals or information, or measurements performed thereon (e.g., signals or information 855), may be passed to other components of the wireless device 805. For example, the receiver 810 may process signals and pass scheduled uplink transmission 855 to uplink manager 825. The receiver 810 may include a single antenna or a set of antennas.

The base station communications manager 815 may be an example of aspects of the base station communications manager 715 or 1015 described with reference to FIG. 7 or 10. The base station communications manager 815 may include an uplink manager 825, a transmission scheduler 830, and a transmission manager 835.

The uplink manager 825 may identify a parameter of a scheduled uplink transmission 855 from a UE. In some examples, identifying the parameter of the scheduled uplink transmission may include at least one of: receiving the parameter from the UE, inferring the parameter from a transmission received from the UE, inferring the parameter from non-receipt of a transmission from the UE, or a combination thereof. In some examples, the parameter of the scheduled uplink transmission may include at least one of: an identifier of at least one subframe in which the scheduled uplink transmission is transmitted, a number of subframes in which the scheduled uplink transmission is transmitted, a periodicity of the scheduled uplink transmission, a duration of the scheduled uplink transmission, or a combination thereof.

The transmission scheduler 830 may be used to schedule a downlink transmission with repetition in a plurality of subframes 875 based at least in part on a parameter of the scheduled uplink transmission 870 received from the uplink manager 825. In some examples, the downlink transmission may be scheduled after the scheduled uplink transmission based at least in part on the parameter of the scheduled uplink transmission 870.

The transmission manager 835 may be used to perform the downlink transmission 860 according to the scheduling information 875 received from the transmission scheduler 830.

In some examples, the uplink transmission may include at least one of a PUCCH, a PUSCH, or a combination thereof, and the downlink transmission may include at least one of a PDSCH, a MPDCCH, or a combination thereof. For example, the uplink transmission may include a PUCCH format 2 transmission, and the downlink transmission may include a PDSCH transmission.

The transmitter 820 may receive and transmit data or control signals or information (i.e., transmissions 860, 865) generated by other components of the wireless device 805, some or all of which may be associated with various information channels (e.g., data channels, control channels, etc.). In some examples, the transmitter 820 may be collocated with the receiver 810 in a transceiver. For example, the transmitter 820 and receiver 810 may be an example of aspects of the transceiver 1035 described with reference to FIG. 10. The transmitter 820 may include a single antenna or a set of antennas.

Figure 9:
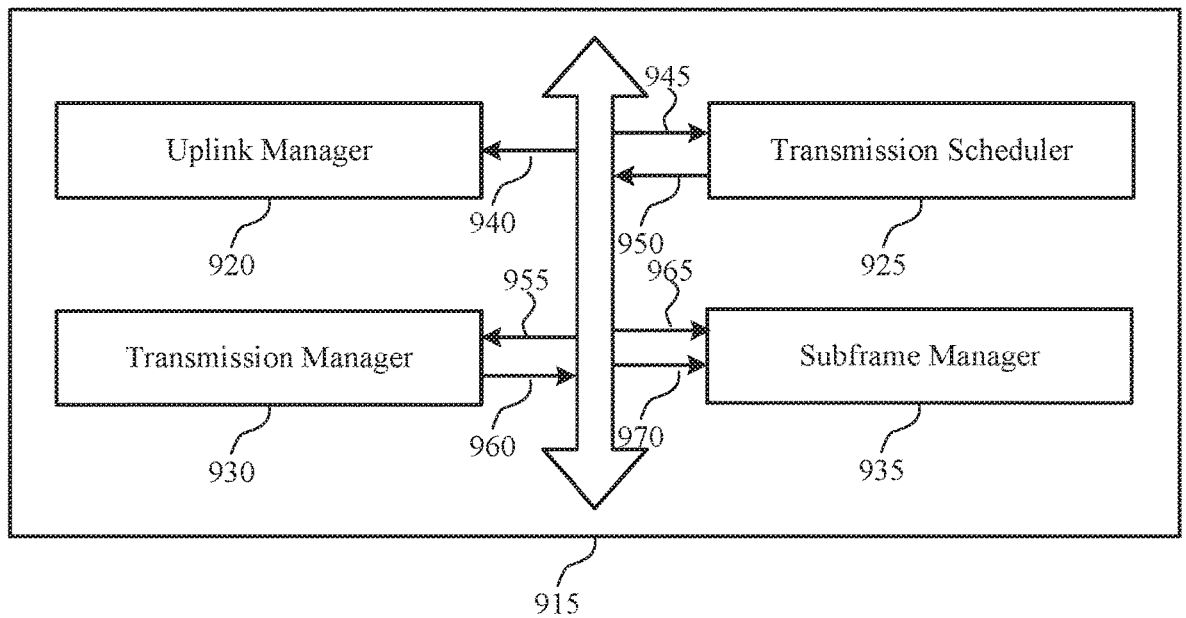

FIG. 9 shows a block diagram 900 of a base station communications manager 915 that supports techniques for handling collisions between uplink transmissions and downlink transmissions over a wireless spectrum in accordance with aspects of the present disclosure. The base station communications manager 915 may be an example of aspects of the base station communications manager 715, 815, or 1015 described with reference to FIGS. 7, 8, and 10. The base station communications manager 915 may include an uplink manager 920, a transmission scheduler 925, a transmission manager 930, and a subframe manager 935. Each of these components may communicate, directly or indirectly, with one another (e.g., via one or more buses).

The uplink manager 920, transmission scheduler 925, and transmission manager 930 may be used to perform some or all of the respective functions of the uplink manager 825, transmission scheduler 830, and transmission manager 835 described with reference to FIG. 8, and in some cases may perform one or more of the additional functions described below.

In some examples, the uplink manager 920 may receive a parameter of a scheduled uplink transmission 940 and identify it. The identified parameter of the scheduled uplink transmission 940 may include a number of subframes in which the scheduled uplink transmission is repeated.

In some examples, the transmission scheduler 925 may select a total number of subframes, in which to schedule a downlink transmission with repetition 950, based at least in part on the parameter of a scheduled uplink transmission 945. The transmission scheduler 925 may schedule the downlink transmission 950 such that a scheduled uplink transmission does not collide with a predetermined number of subframes of at least a beginning portion of the downlink transmission 950. In these examples, the transmission scheduler 925 may be used to transmit an indication of the number of subframes to the UE, and to schedule a downlink transmission 950 to avoid a collision with a scheduled uplink transmission.

In some examples, the transmission manager 930 may be used to puncture at least one subframe in which a downlink transmission with repetition 960 is transmitted, based at least in part on a parameter of a scheduled uplink transmission 955 identified by the uplink manager 920. In some examples, the subframe manager 935 may receive downlink transmission information 965 and scheduled uplink transmission information 970. The subframe manager 935 may perform a collision management procedure based at least in part on the downlink transmission colliding with at least one of a scheduled uplink transmission or a guard frame for the scheduled uplink transmission.

Figure 10:
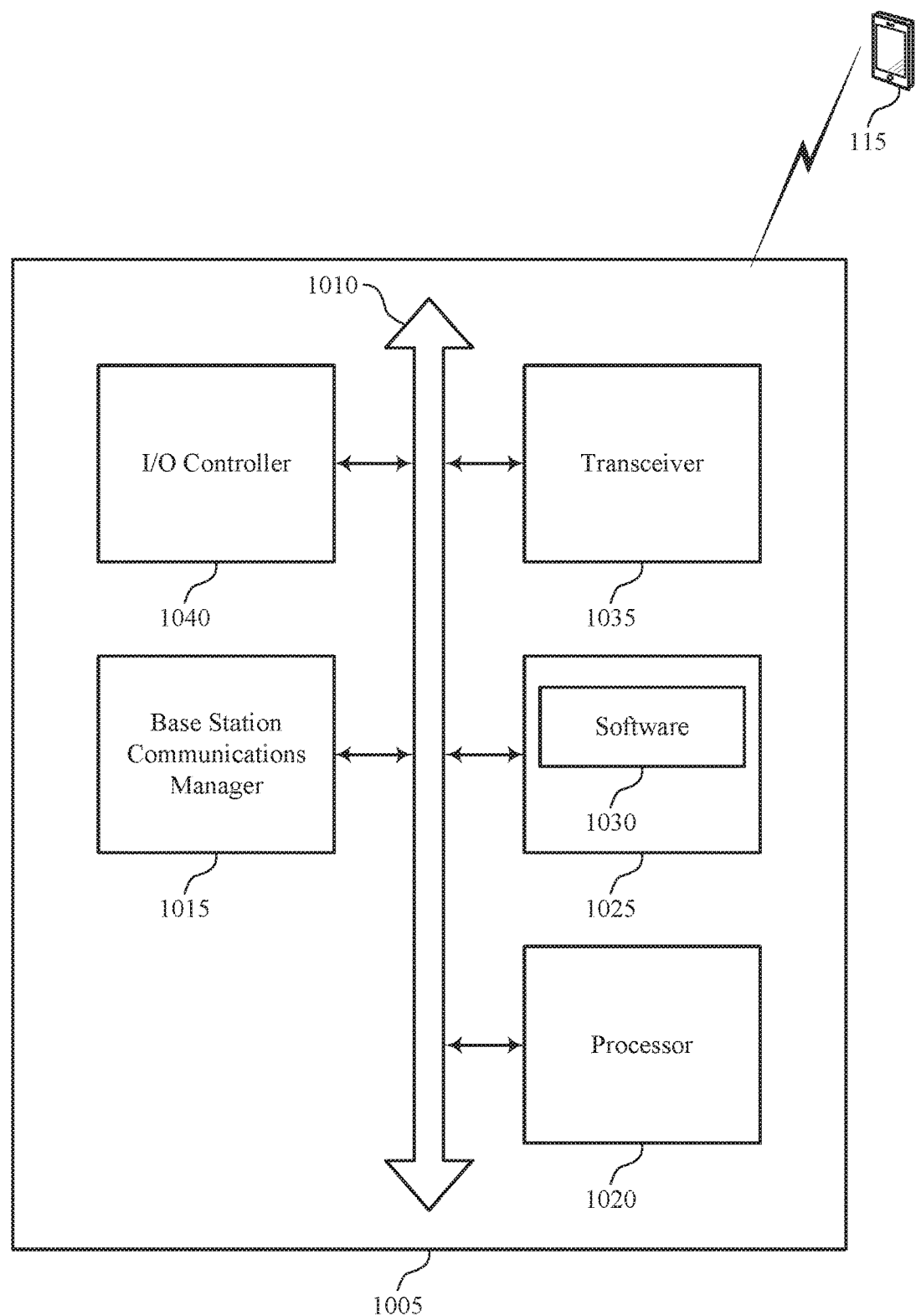
FIG. 10 illustrates a block diagram of a system including a network scheduler that supports techniques for handling collisions between uplink transmissions and downlink transmissions over a wireless spectrum in accordance with aspects of the present disclosure.

FIG. 10 shows a diagram of a system 1000 including a device 1005 that supports techniques for handling collisions between uplink transmissions and downlink transmissions over a wireless spectrum in accordance with aspects of the present disclosure. The device 1005 may be an example of or include the components of base station 105 or wireless device 705 or 805 as described with reference to FIG. 1, 7, or 8. The device 1005 may include components for bi-directional voice and data communications including components for transmitting and receiving communications. The device 1005 may include a base station communications manager 1015, a processor 1020, a memory 1025, software 1030, a transceiver 1035, and an I/O controller 1040. These components may be in electronic communication via one or more busses (e.g., bus 1010).

The processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1020 may be configured to operate a memory array using a memory controller. In other cases, a memory controller may be integrated into the processor 1020. The processor 1020 may be configured to execute computer-readable instructions stored in a memory to perform various functions (e.g., functions or tasks supporting techniques for handling collisions between uplink transmissions and downlink transmissions over a wireless spectrum).

The memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware and/or software operation such as the interaction with peripheral components or devices.

The software 1030 may include code to implement aspects of the present disclosure, including code to support techniques for handling collisions between uplink transmissions and downlink transmissions over a wireless spectrum. The software 1030 may be stored in a non-transitory computer-readable medium such as system memory or other memory. In some cases, the software 1030 may not be directly executable by the processor but may cause a computer (e.g., when compiled and executed) to perform functions described herein.

The transceiver 1035 may communicate hi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

The I/O controller 1040 may manage input and output signals for the device 1005. The I/O controller 1040 may also manage peripherals not integrated into the device 1005. In some cases, the I/O controller 1040 may represent a physical connection or port to an external peripheral. In some cases, the I/O controller 1040 may utilize an operating system such as iOS®, ANDROID®, MS-DOS®, MS-WINDOWS®, OS/2®, UNIX®, LINUX®, or another known operating system. In other cases, the I/O controller 1040 may represent or interact with a modem, a keyboard, a mouse, a touchscreen, or a similar device. In some cases, the I/O controller 1040 may be implemented as part of a processor. In some cases, a user may interact with the device 1005 via the I/O controller 1040 or via hardware components controlled by the I/O controller 1040.

Figure 11:
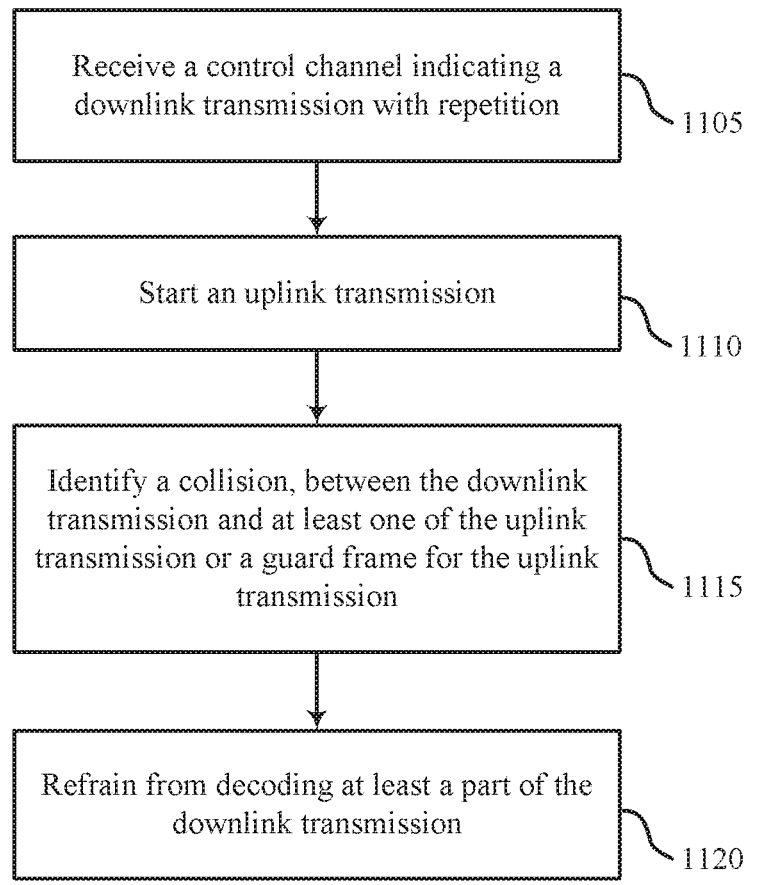
FIGS. 11 through 21 illustrate methods for techniques for handling collisions between uplink transmissions and downlink transmissions over a wireless spectrum in accordance with aspects of the present disclosure.

FIG. 11 shows a flowchart illustrating a method 1100 for handling collisions between uplink transmissions and downlink transmissions over a wireless spectrum in accordance with aspects of the present disclosure. The operations of method 1100 may be implemented by a UE 115 or its components as described herein. In some examples, the operations of method 1100 may be performed by a UE communications manager as described with reference to FIGS. 3 through 6. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may receive a control channel indicating a downlink transmission with repetition in a plurality of subframes. In some examples, the control channel may be received by identifying time-frequency resources that carry the control channel, and by identifying resources that carry reference signals for decoding the control channel. In some examples, information bits received on the time-frequency resources of the control channel may be decoded based at least in part on the reference signals. The operations of block 1105 may be performed according to the techniques described with reference to FIGS. 1 and 2. In certain examples, aspects of the operations of block 1105 may be performed by a control channel manager as described with reference to FIGS. 4 and 5.

At block 1110 the UE 115 may start an uplink transmission after receiving the control channel. The uplink transmission may be made on resources (e.g., time-frequency resources) allocated to the UE 115 in an uplink grant received from a base station, or on semi-persistently scheduled (SPS) resources. In some examples, the uplink transmission may be expected by a base station. In other examples, the uplink transmission may be optionally transmitted by the UE 115 (e.g., in response to a trigger condition being satisfied). In some examples, the uplink transmission may be started before a start of the downlink transmission or within a first few subframes of the downlink transmission. In some examples, the uplink transmission may include at least one of a PUCCH, a PUSCH, or a combination thereof, and the downlink transmission may include at least one of a PDSCH, a MPDCCH, or a combination thereof. For example, the uplink transmission may include a PUCCH format 2, transmission, and the downlink transmission may include a PDSCH transmission. The operations of block 1110 may be performed according to the techniques described with reference to FIGS. 1 and 2. In certain examples, aspects of the operations of block 1110 may be performed by a transmission manager as described with reference to FIGS. 4 and 5.

At block 1115 the UE 115 may identify a collision between the downlink transmission and at least one of the uplink transmission or a guard frame for the uplink transmission. In some examples, the collision may be identified by comparing the time-frequency resource locations identified in the control channel for receiving the downlink transmission to time-frequency resource locations identified by the UE 115 for transmitting the uplink transmission, and determining there is an overlap between the resources. The collision may occur in at least one subframe of the plurality of subframes in which the downlink transmission is to be received. The operations of block 1115 may be performed according to the techniques described with reference to FIGS. 1 and 2. In certain examples, aspects of the operations of block 1115 may be performed by a collision identifier as described with reference to FIGS. 4 and 5.

At block 1120 the UE 115 may refrain from decoding at least a part of the downlink transmission based at least in part on the identified collision (e.g., to avoid or mitigate the identified collision). In some examples, refraining from decoding at least part of the downlink transmission may include refraining from decoding all of the downlink transmission, or refraining from decoding the downlink transmission in the at least one subframe in which the collision is identified. The operations of block 1120 may be performed according to the techniques described with reference to FIGS. 1 and 2. In certain examples, aspects of the operations of block 1120 may be performed by a collision manager as described with reference to FIGS. 4 and 5.

Figure 12:
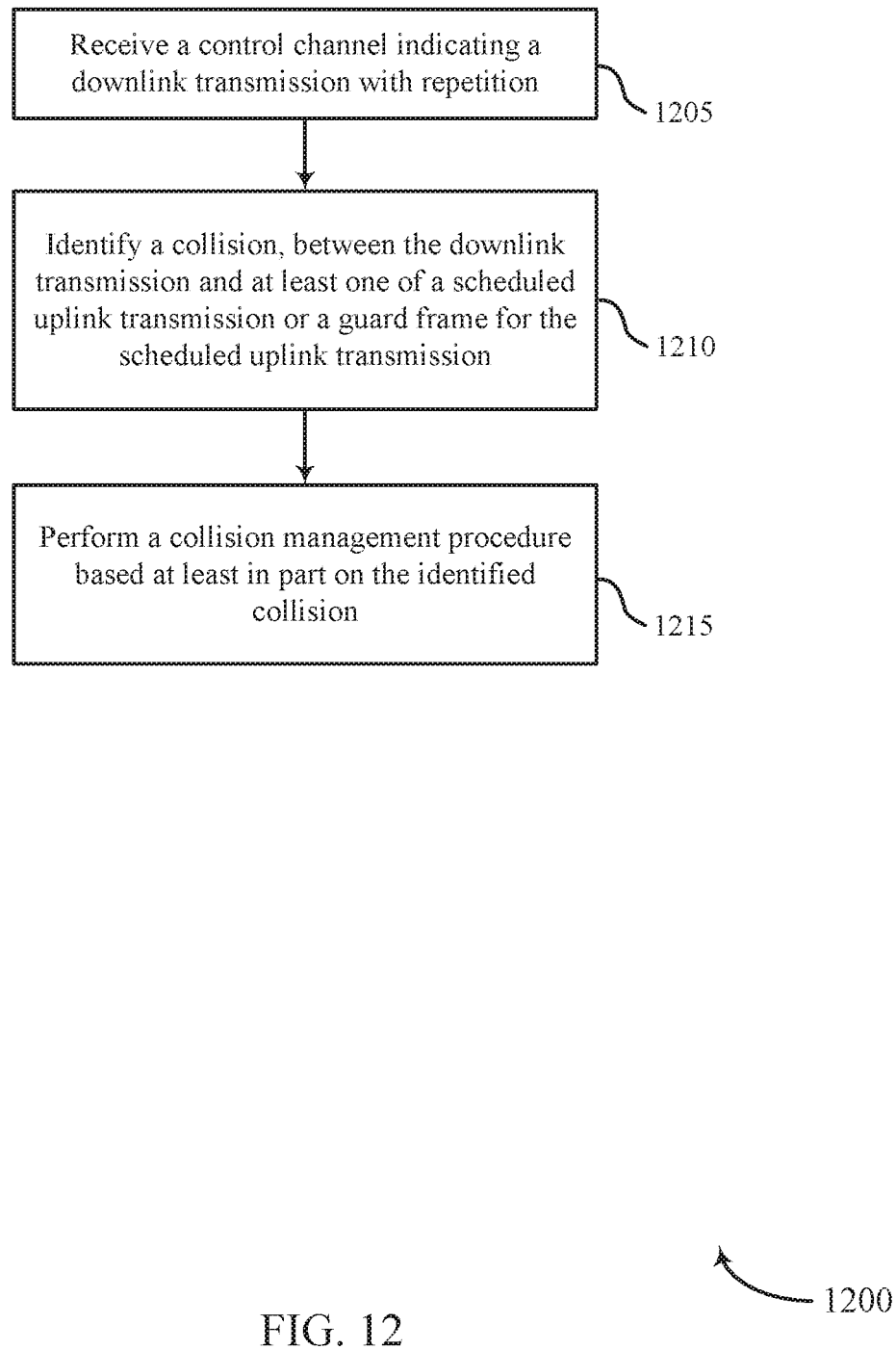

FIG. 12 shows a flowchart illustrating a method 1200 for handling collisions between uplink transmissions and downlink transmissions over a wireless spectrum in accordance with aspects of the present disclosure. The operations of method 1200 may be implemented by a UE 115 or its components as described herein. In some examples, the operations of method 1200 may be performed by a UE communications manager as described with reference to FIGS. 3 through 6. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may receive a control channel indicating a downlink transmission with repetition in a plurality of subframes. In some examples, the control channel may be received by identifying time-frequency resources that carry the control channel, and by identifying resources that carry reference signals for decoding the control channel. In some examples, information bits received on the time-frequency resources of the control channel may be decoded based at least in part on the reference signals. The operations of block 1205 may be performed according to the techniques described with reference to FIGS. 1 and 2. In certain examples, aspects of the operations of block 1205 may be performed by a control channel manager as described with reference to FIGS. 4 and 5.

At block 1210 the UE 115 may identify a collision between the downlink transmission and at least one of a scheduled uplink transmission or a guard frame for the scheduled uplink transmission. In some examples, the collision may be identified by comparing the time-frequency resource locations identified in the control channel for receiving the downlink transmission to time-frequency resource locations identified by the UE 115 for transmitting the scheduled uplink transmission, and determining there is an overlap between the resources. The collision may occur in at least one subframe of the plurality of subframes in which the downlink transmission is to be received. In some examples, the scheduled uplink transmission may include at least one of a PUCCH, a PUSCH, or a combination thereof, and the downlink transmission may include at least one of a PDSCH, a MPDCCH, or a combination thereof. For example, the scheduled uplink transmission may include a PUCCH format 2 transmission, and the downlink transmission may include a PDSCH transmission. The operations of block 1210 may be performed according to the techniques described with reference to FIGS. 1 and 2. In certain examples, aspects of the operations of block 1210 may be performed by a collision identifier as described with reference to FIGS. 4 and 5.

At block 1215 the UE 115 may perform a collision management procedure based at least in part on the identified collision (e.g., to avoid or mitigate the identified collision). The collision management procedure may include refraining from transmitting at least part of the scheduled uplink transmission, refraining from decoding at least part of the downlink transmission, or a combination thereof. For example, the scheduled uplink transmission may include a first set of subframes of the scheduled uplink transmission that collide with the downlink transmission that occur prior to a predetermined number "x" of subframes following the MPDCCH and a second set of subframes that collide with the downlink transmission that are subsequent to the predetermined number "x" of subframes following the MPDCCH. The UE 115 may determine to decode the downlink transmission received on the second set of subframes and refrain from transmitting at least part of the scheduled uplink transmission on the second set of subframes. The operations of block 1215 may be performed according to the techniques described with reference to FIGS. 1 and 2. In certain examples, aspects of the operations of block 1215 may be performed by a collision manager as described with reference to FIGS. 4 and 5.

Figure 13:
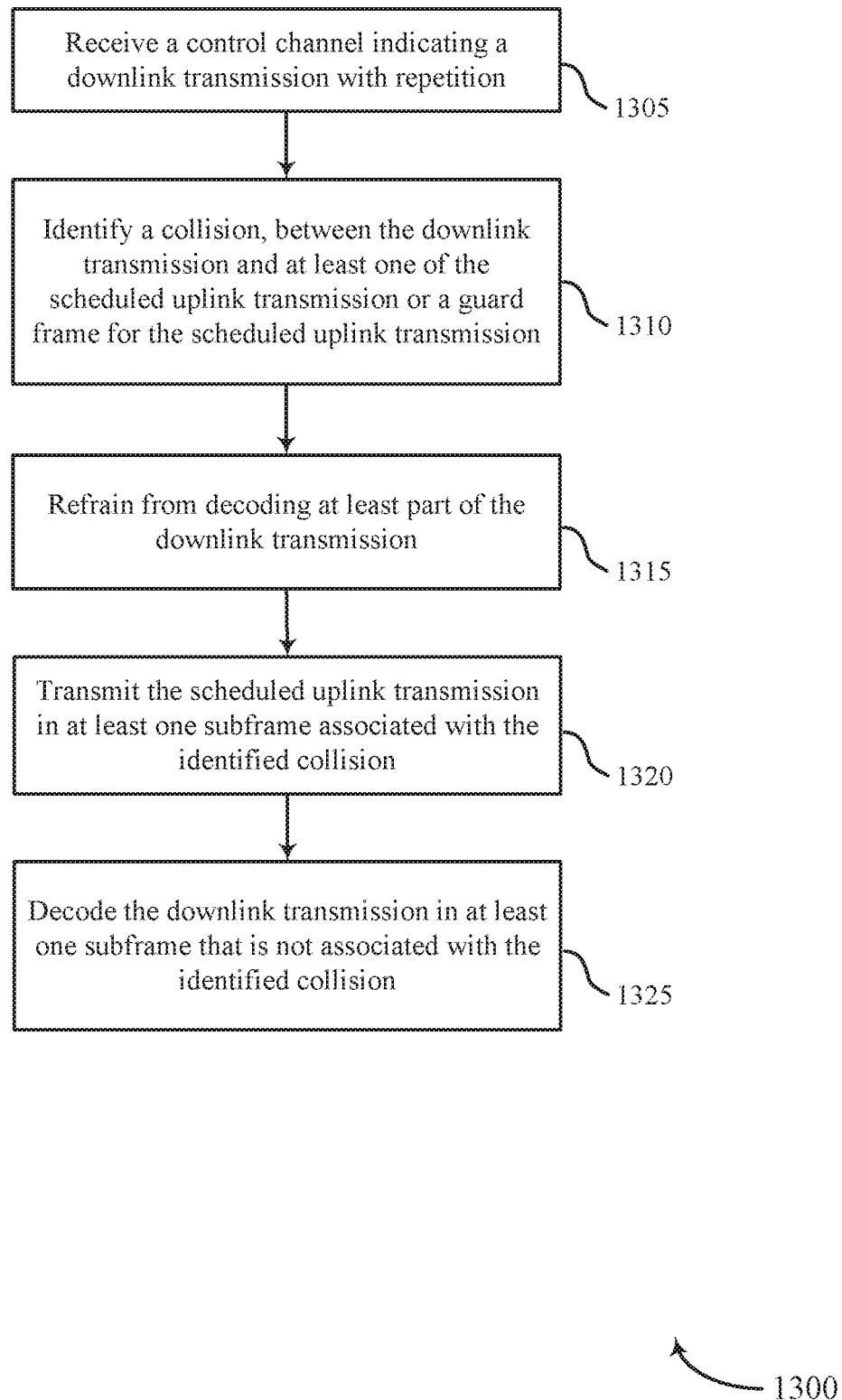

FIG. 13 shows a flowchart illustrating a method 1300 for handling collisions between uplink transmissions and downlink transmissions over a wireless spectrum in accordance with aspects of the present disclosure. The operations of method 1300 may be implemented by a UE 115 or its components as described herein. In some examples, the operations of method 1300 may be performed by a UE communications manager as described with reference to FIGS. 3 through 6. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may receive a control channel indicating a downlink transmission with repetition in a plurality of subframes. In some examples, the control channel may be received by identifying time-frequency resources that carry the control channel, and by identifying resources that carry reference signals for decoding the control channel. In some examples, information bits received on the time-frequency resources of the control channel may be decoded based at least in part on the reference signals. The operations of block 1305 may be performed according to the techniques described with reference to FIGS. 1 and 2. In certain examples, aspects of the operations of block 1305 may be performed by a control channel manager as described with reference to FIGS. 4 and 5.

At block 1310 the UE 115 may identify a collision between the downlink transmission and at least one of a scheduled uplink transmission or a guard frame for the scheduled uplink transmission. In some examples, the collision may be identified by comparing the time-frequency resource locations identified in the control channel for receiving the downlink transmission to time-frequency resource locations identified by the UE 115 for transmitting the scheduled uplink transmission, and determining there is an overlap between the resources. The collision may occur in at least one subframe of the plurality of subframes in which the downlink transmission is to be received. In some examples, the scheduled uplink transmission may include at least one of a PUCCH, a PUSCH, or a combination thereof, and the downlink transmission may include at least one of a PDSCH, a MPDCCH, or a combination thereof. For example, the scheduled uplink transmission may include a PUCCH format 2 transmission, and the downlink transmission may include a PDSCH transmission. The operations of block 1310 may be performed according to the techniques described with reference to FIGS. 1 and 2. In certain examples, aspects of the operations of block 1310 may be performed by a collision identifier as described with reference to FIGS. 4 and 5.

At block 1315 the UE 115 may perform a collision management procedure based at least in part on the identified collision (e.g., to avoid or mitigate the identified collision). Performing the collision management procedure may include refraining from decoding at least part of the downlink transmission. The operations of block 1315 may be performed according to the techniques described with reference to FIGS. 1 and 2. In certain examples, aspects of the operations of block 1315 may be performed by a collision manager as described with reference to FIGS. 4 and 5.

At block 1320 the UE 115 may transmit the scheduled uplink transmission in the at least one subframe associated with the identified collision. The scheduled uplink transmission may be made on resources (e.g., time-frequency resources) allocated to the UE 115 in an uplink grant received from a base station, or on SPS resources. In some examples, the scheduled uplink transmission may be expected by a base station. In other examples, the scheduled uplink transmission may be optionally transmitted by the UE 115 (e.g., in response to a trigger condition being satisfied). The operations of block 1320 may be performed according to the techniques described with reference to FIGS. 1 and 2. In certain examples, aspects of the operations of block 1320 may be performed by a transmission manager as described with reference to FIGS. 4 and 5.

At block 1325 the UE 115 may decode the downlink transmission in at least one other subframe that is not associated with the identified collision. In some examples, the downlink transmission may be decoded by identifying time-frequency resources allocated for the downlink transmission (or for a channel carrying the downlink transmission) in the control channel, and by identifying resources that carry reference signals for decoding the control channel. In some examples, information bits received on the tune-frequency resources allocated for the downlink transmission (or channel carrying the downlink transmission) may be decoded based at least in part on the reference signals. The operations of block 1325 may be performed according to the techniques described with reference to FIGS. 1 and 2. In certain examples, aspects of the operations of block 1325 may be performed by a decoder as described with reference to FIG. 5.

Figure 14:
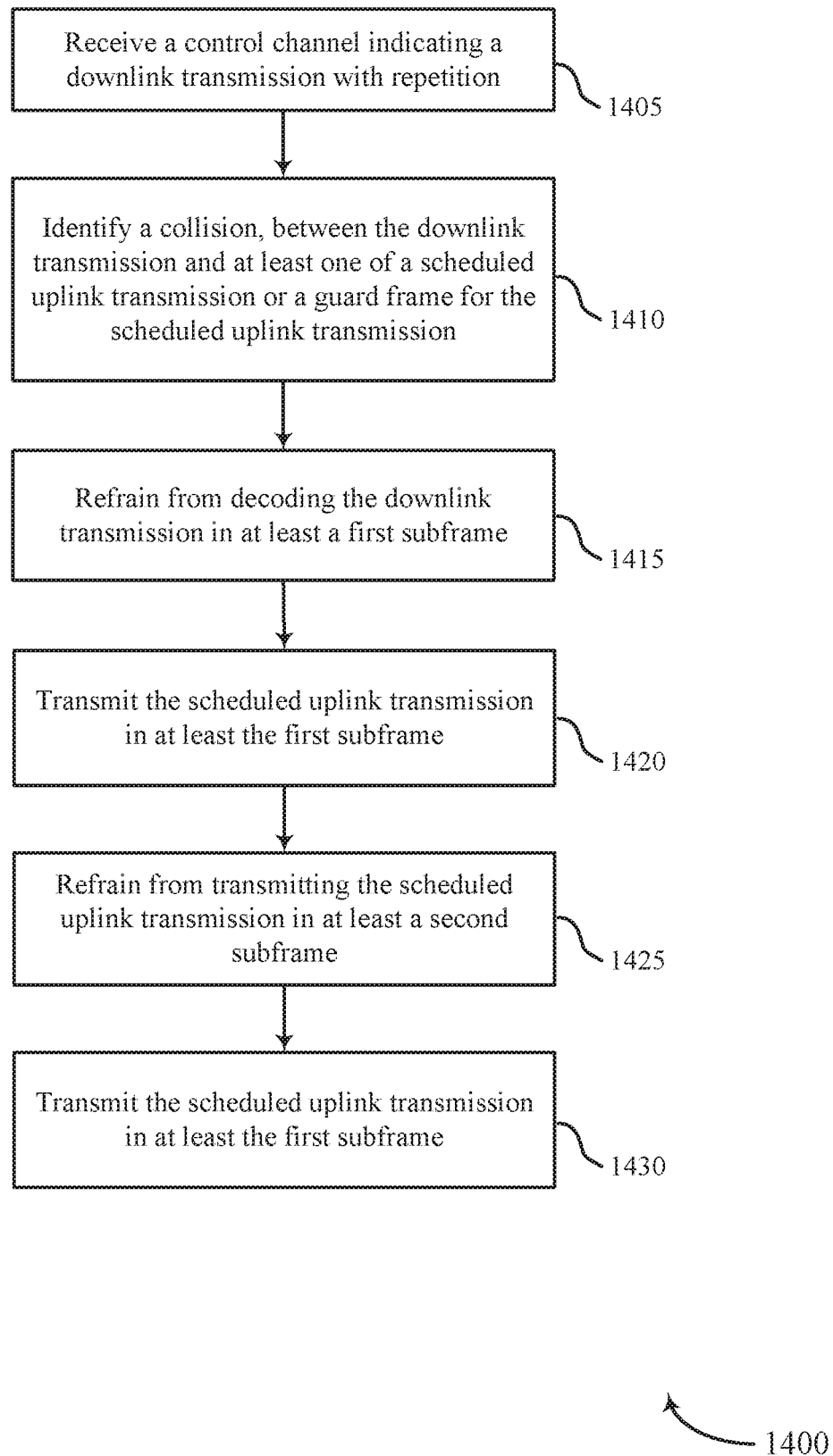

FIG. 14 shows a flowchart illustrating a method 1400 for handling collisions between uplink transmissions and downlink transmissions over a wireless spectrum in accordance with aspects of the present disclosure. The operations of method 1400 may be implemented by a UE 115 or its components as described herein. In some examples, the operations of method 1400 may be performed by a UE communications manager as described with reference to FIGS. 3 through 6. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive a control channel indicating a downlink transmission with repetition in a plurality of subframes. In some examples, the control channel may be received by identifying time-frequency resources that carry the control channel, and by identifying resources that carry reference signals for decoding the control channel. In some examples, information bits received on the time-frequency resources of the control channel may be decoded based at least in part on the reference signals. The operations of block 1405 may be performed according to the techniques described with reference to FIGS. 1 and 2. In certain examples, aspects of the operations of block 1405 may be performed by a control channel manager as described with reference to FIGS. 4 and 5.

At block 1410 the UE 115 may identify a collision between the downlink transmission and at least one of a scheduled uplink transmission or a guard frame for the scheduled uplink transmission. In some examples, the collision may be identified by comparing the time-frequency resource locations identified in the control channel for receiving the downlink transmission to time-frequency resource locations identified by the UE 115 for transmitting the scheduled uplink transmission, and determining there is an overlap between the resources. The collision may occur in at least one subframe of the plurality of subframes in which the downlink transmission is to be received. In some examples, the scheduled uplink transmission may include at least one of a PUCCH, a PUSCH, or a combination thereof, and the downlink transmission may include at least one of a PDSCH, a MPDCCH, or a combination thereof. For example, the scheduled uplink transmission may include a PUCCH format 2 transmission, and the downlink transmission may include a PDSCH transmission. The operations of block 1410 may be performed according to the techniques described with reference to FIGS. 1 and 2. In certain examples, aspects of the operations of block 1410 may be performed by a collision identifier as described with reference to FIGS. 4 and 5.

At blocks 1415 and 1425 the UE 115 may perform a collision management procedure based at least in part on the identified collision (e.g., to avoid or mitigate the identified collision). At block 1415, performing the collision management procedure may include refraining from decoding the downlink transmission in at least a first subframe of the at least one subframe associated with the identified collision. The operations of block 1415 may be performed according to the techniques described with reference to FIGS. 1 and 2. In certain examples, aspects of the operations of block 1415 may be performed by a collision manager as described with reference to FIGS. 4 and 5.

At block 1420 the UE 115 may transmit the scheduled uplink transmission in at least the first subframe (e.g., in the first subframe or in a first few subframes). The scheduled uplink transmission may be made on resources (e.g., time-frequency resources) allocated to the UE 115 in an uplink grant received from a base station, or on semi-persistently scheduled (SPS) resources. In some examples, the scheduled uplink transmission may be expected by a base station. In other examples, the scheduled uplink transmission may be optionally transmitted by the UE 115 (e.g., in response to a trigger condition being satisfied). The operations of block 1420 may be performed according to the techniques described with reference to FIGS. 1 and 2. In certain examples, aspects of the operations of block 1420 may be performed by a transmission manager as described with reference to FIGS. 4 and 5.

At block 1425 the UE 115 may further perform the collision management procedure by refraining from transmitting the scheduled uplink transmission in at least a second subframe of the at least one subframe associated with the identified collision. The operations of block 1425 may be performed according to the techniques described with reference to FIGS. 1 and 2. In certain examples, aspects of the operations of block 1425 may be performed by the collision manager as described with reference to FIGS. 4 and 5.

At block 1430 the UE 115 may decode the downlink transmission in at least the second subframe (e.g., in the first subframe or in a first few subframes). In some examples, the downlink transmission may be decoded by identifying time-frequency resources allocated for the downlink transmission (or for a channel carrying the downlink transmission) in the control channel, and by identifying resources that carry reference signals for decoding the control channel. In some examples, information bits received on the time-frequency resources allocated for the downlink transmission (or channel carrying the downlink transmission) may be decoded based at least in part on the reference signals. The operations of block 1430 may be performed according to the techniques described with reference to FIGS. 1 and 2. In certain examples, aspects of the operations of block 1430 may be performed by a decoder as described with reference to FIG. 5.

Figure 15:
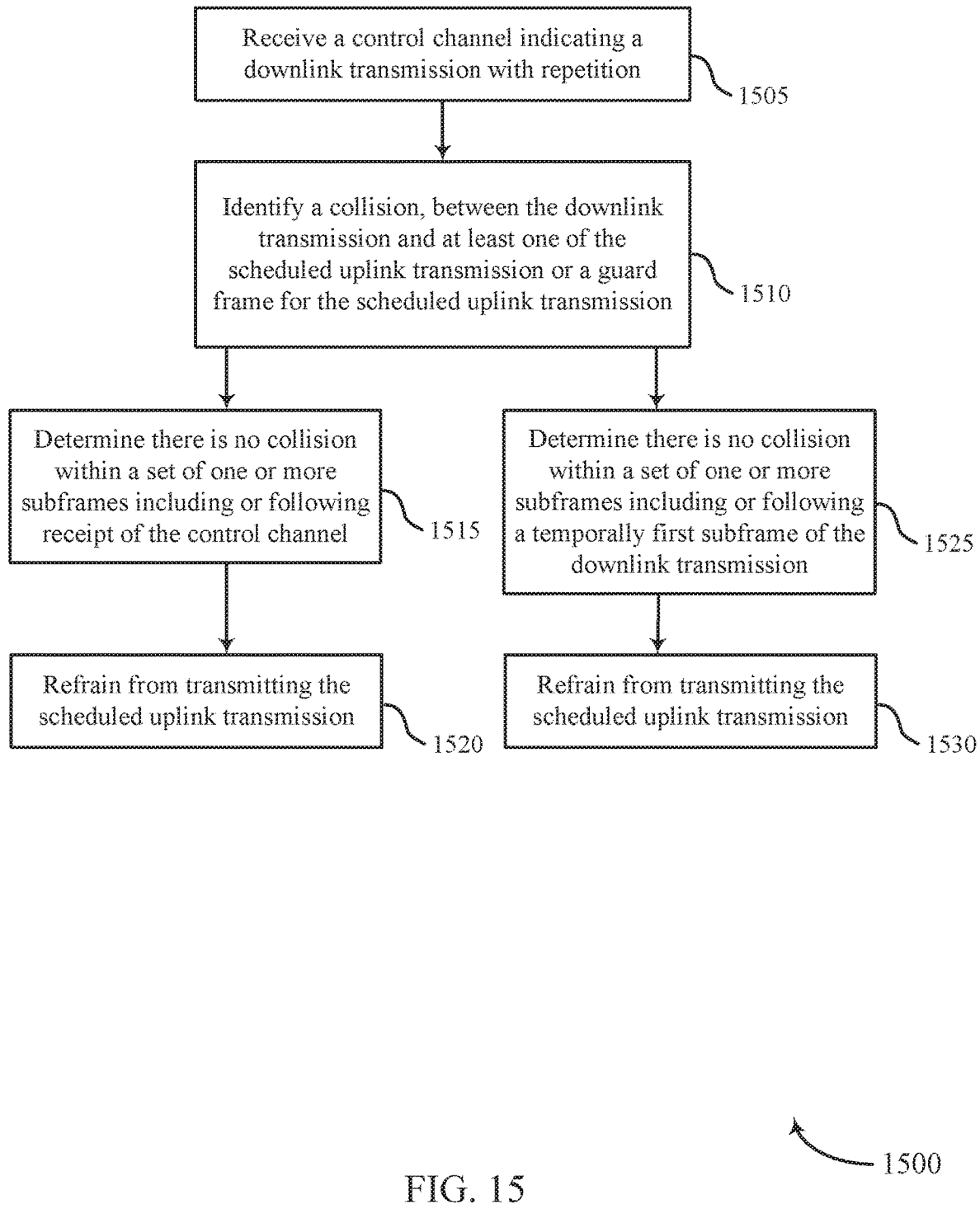

FIG. 15 shows a flowchart illustrating a method 1500 for handling collisions between uplink transmissions and downlink transmissions over a wireless spectrum in accordance with aspects of the present disclosure. The operations of method 1500 may be implemented by a UE 115 or its components as described herein. In some examples, the operations of method 1500 may be performed by a UE communications manager as described with reference to FIGS. 3 through 6. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive a control channel indicating a downlink transmission with repetition in a plurality of subframes. In some examples, the control channel may be received by identifying time-frequency resources that carry the control channel, and by identifying resources that carry reference signals for decoding the control channel. In some examples, information bits received on the time-frequency resources of the control channel may be decoded based at least in part on the reference signals. The operations of block 1505 may be performed according to the techniques described with reference to FIGS. 1 and 2. In certain examples, aspects of the operations of block 1505 may be performed by a control channel manager as described with reference to FIGS. 4 and 5.

At block 1510 the UE 115 may identify a collision between the downlink transmission and at least one of a scheduled uplink transmission or a guard frame for the scheduled uplink transmission. In some examples, the collision may be identified by comparing the time-frequency resource locations identified in the control channel for receiving the downlink transmission to ante-frequency resource locations identified by the UE 115 for transmitting the scheduled uplink transmission, and determining there is an overlap between the resources. The collision may occur in at least one subframe of the plurality of subframes in which the downlink transmission is to be received. In some examples, the scheduled uplink transmission may include at least one of a PUCCH, a PUSCH, or a combination thereof, and the downlink transmission may include at least one of a PDSCH, a MPDCCH, or a combination thereof. For example, the scheduled uplink transmission may include a PUCCH format 2 transmission, and the downlink transmission may include a PDSCH transmission. The operations of block 1510 may be performed according to the techniques described with reference to FIGS. 1 and 2. In certain examples, aspects of the operations of block 1510 may be performed by a collision identifier as described with reference to FIGS. 4 and 5.

Following the operations of block 1510, the method 1500 may continue at block 1515 or 1525. At block 1515 the UE 115 may determine there is no collision (e.g., between the downlink transmission and at least one of the scheduled uplink transmission or the guard frame for the scheduled uplink transmission) within a set of one or more subframes including or following a subframe in which the control channel is received. The operations of block 1515 may be performed according to the techniques described with reference to FIGS. 1 and 2. In certain examples, aspects of the operations of block 1515 may be performed by a collision identifier as described with reference to FIGS. 4 and 5.

At block 1520 the UE 115 may perform a collision management procedure based at least in part on the identified collision (e.g., to avoid or mitigate the identified collision). The collision management procedure may include refraining from transmitting the scheduled uplink transmission based at least in part on the determination made at block 1515. The operations of block 1520 may be performed according to the techniques described with reference to FIGS. 1 and 2. In certain examples, aspects of the operations of block 1520 may be performed by a collision manager as described with reference to FIGS. 4 and 5.

At block 1525 the UE 115 may determine there is no collision (e.g., between the downlink transmission and at least one of the scheduled uplink transmission or the guard frame for the scheduled uplink transmission) within a set of one or more subframes including or following a temporally first subframe in the plurality of subframes associated with the downlink transmission. The operations of block 1525 may be performed according to the techniques described with reference to FIGS. 1 and 2. In certain examples, aspects of the operations of block 1525 may be performed by a collision identifier as described with reference to FIGS. 4 and 5.

At block 1530 the UE 115 may perform a collision management procedure based at least in part on the identified collision (e.g., to avoid or mitigate the identified collision). The collision management procedure may include refraining from transmitting the scheduled uplink transmission based at least in part on the determination made at block 1525. The operations of block 1530 may be performed according to the techniques described with reference to FIGS. 1 and 2. In certain examples, aspects of the operations of block 1530 may be performed by a collision manager as described with reference to FIGS. 4 and 5.

Figure 16:
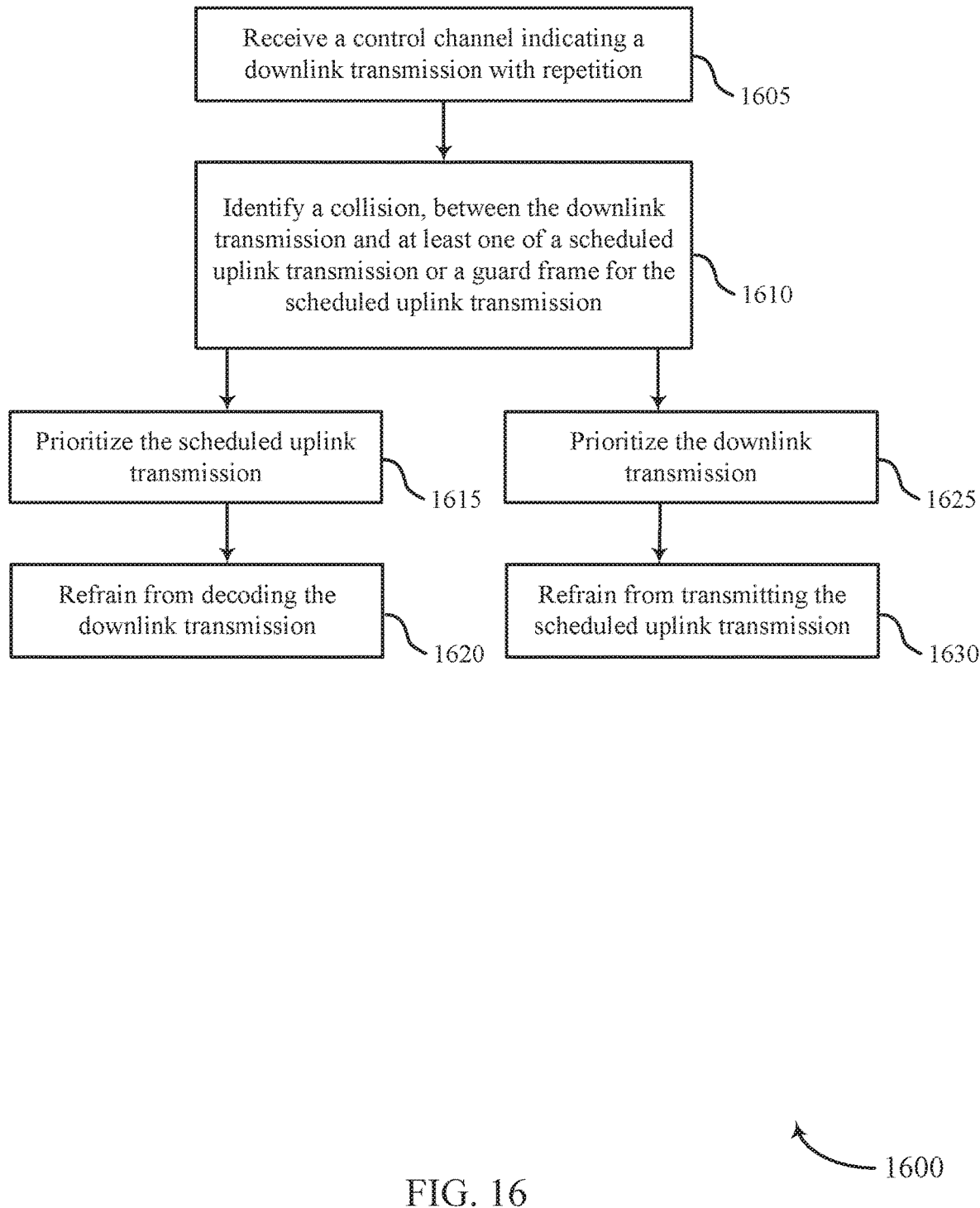

FIG. 16 shows a flowchart illustrating a method 1600 for handling collisions between uplink transmissions and downlink transmissions over a wireless spectrum in accordance with aspects of the present disclosure. The operations of method 1600 may be implemented by a UE 115 or its components as described herein. In some examples, the operations of method 1600 may be performed by a UE communications manager as described with reference to FIGS. 3 through 6. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive a control channel indicating a downlink transmission with repetition in a plurality of subframes. In some examples, the control channel may be received by identifying time-frequency resources that carry the control channel, and by identifying resources that carry reference signals for decoding the control channel. In some examples, information bits received on the time-frequency resources of the control channel may be decoded based at least in part on the reference signals. The operations of block 1605 may be performed according to the techniques described with reference to FIGS. 1 and 2. In certain examples, aspects of the operations of block 1605 may be performed by a control channel manager as described with reference to FIGS. 4 and 5.

At block 1610 the UE 115 may identify a collision between the downlink transmission and at least one of a scheduled uplink transmission or a guard frame for the scheduled uplink transmission. In some examples, the collision may be identified by comparing the time-frequency resource locations identified in the control channel for receiving the downlink transmission to time-frequency resource locations identified by the UE 115 for transmitting the scheduled uplink transmission, and determining there is an overlap between the resources. The collision may occur in at least one subframe of the plurality of subframes in which the downlink transmission is to be received. In some examples, the scheduled uplink transmission may include at least one of a PUCCH, a PUSCH, or a combination thereof, and the downlink transmission may include at least one of a PDSCH, a MPDCCH, or a combination thereof. For example, the scheduled uplink transmission may include a PUCCH format 2 transmission, and the downlink transmission may include a PDSCH transmission. The operations of block 1610 may be performed according to the techniques described with reference to FIGS. 1 and 2. In certain examples, aspects of the operations of block 1610 may be performed by a collision identifier as described with reference to FIGS. 4 and 5.

Following the operations of block 1610, the method 1600 may continue at block 1615 or 1625. At blocks 1615 and 1620 the UE 115 may perform a collision management procedure based at least in part on the identified collision (e.g., to avoid or mitigate the identified collision). At block 1615, performing the collision management procedure may include prioritizing the scheduled uplink transmission after identifying the collision, to transmit the scheduled uplink transmission before decoding the downlink transmission in any subframe. The operations of block 1615 may be performed according to the techniques described with reference to FIGS. 1 and 2. In certain examples, aspects of the operations of block 1615 may be performed by a collision manager as described with reference to FIGS. 4 and 5.

At block 1620 the UE 115 may further perform the collision management procedure by refraining from decoding the downlink transmission in any subframe in which the scheduled uplink transmission is transmitted. The operations of block 1620 may be performed according to the techniques described with reference to FIGS. 1 and 2. In certain examples, aspects of the operations of block 1620 may be performed by a collision manager as described with reference to FIGS. 4 and 5.

At blocks 1625 and 1630 the UE 115 may perform a collision management procedure based at least in part on the identified collision (e.g., to avoid or mitigate the identified collision). At block 1625, performing the collision management procedure may include prioritizing the downlink transmission after identifying the collision, to decode the downlink transmission before transmitting the scheduled uplink transmission in any subframe. The operations of block 1625 may be performed according to the techniques described with reference to FIGS. 1 and 2. In certain examples, aspects of the operations of block 1625 may be performed by a collision manager as described with reference to FIGS. 4 and 5.

At block 1630 the UE 115 may further perform the collision management procedure by refraining from transmitting the scheduled uplink transmission in any subframe in which the downlink transmission is transmitted. The operations of block 1630 may be performed according to the techniques described with reference to FIGS. 1 and 2. In certain examples, aspects of the operations of block 1630 may be performed by a collision manager as described with reference to FIGS. 4 and 5.

Figure 17:
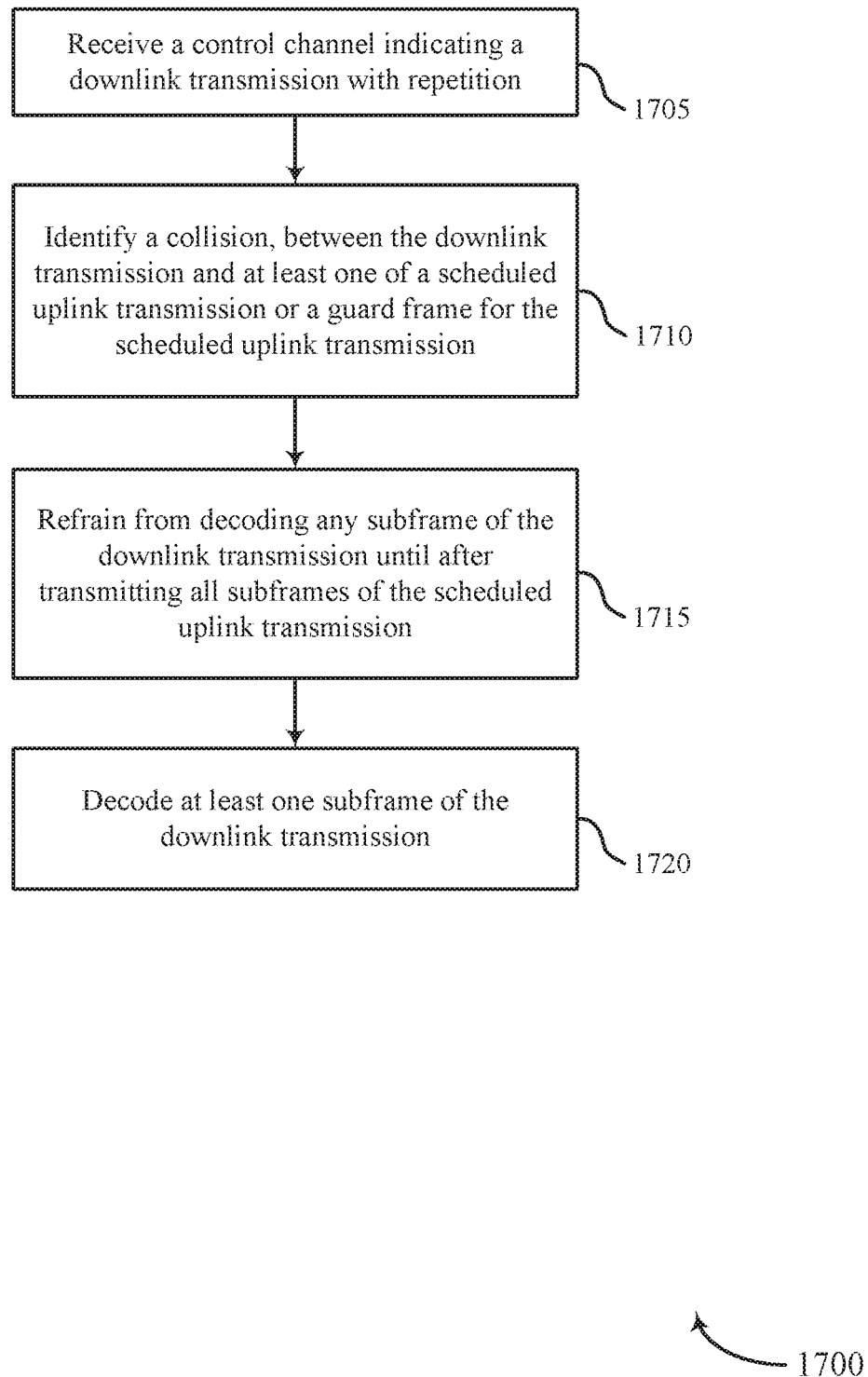

FIG. 17 shows a flowchart illustrating a method 1700 for handling collisions between uplink transmissions and downlink transmissions over a wireless spectrum in accordance with aspects of the present disclosure. The operations of method 1700 may be implemented by a UE 115 or its components as described herein. In some examples, the operations of method 1700 may be performed by a UE communications manager as described with reference to FIGS. 3 through 6. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive a control channel indicating a downlink transmission with repetition in a plurality of subframes. In some examples, the control channel may be received by identifying time-frequency resources that carry the control channel, and by identifying resources that carry reference signals for decoding the control channel. In some examples, information bits received on the time-frequency resources of the control channel may be decoded based at least in part on the reference signals. The operations of block 1705 may be performed according to the techniques described with reference to FIGS. 1 and 2. In certain examples, aspects of the operations of block 1705 may be performed by a control channel manager as described with reference to FIGS. 4 and 5.

At block 1710 the UE 115 may identify a collision between the downlink transmission and at least one of a scheduled uplink transmission or a guard frame for the scheduled uplink transmission. In some examples, the collision may be identified by comparing the time-frequency resource locations identified in the control channel for receiving the downlink transmission to time-frequency resource locations identified by the UE 115 for transmitting the scheduled uplink transmission, and determining there is an overlap between the resources. The collision may occur in at least one subframe of the plurality of subframes in which the downlink transmission is to be received. In some examples, the scheduled uplink transmission may include at least one of a PUCCH, a PUSCH, or a combination thereof, and the downlink transmission may include at least one of a PDSCH, a MPDCCH, or a combination thereof. For example, the scheduled uplink transmission may include a PUCCH format 2 transmission, and the downlink transmission may include a PDSCH transmission. The operations of block 1710 may be performed according to the techniques described with reference to FIGS. 1 and 2. In certain examples, aspects of the operations of block 1710 may be performed by a collision identifier as described with reference to FIGS. 4 and 5.

At block 1715 the UE 115 may perform a collision management procedure based at least in part on the identified collision (e.g., to avoid or mitigate the identified collision). The collision management procedure may include refraining from decoding any subframe of the downlink transmission until after transmitting all subframes of the scheduled uplink transmission. The operations of block 1715 may be performed according to the techniques described with reference to FIGS. 1 and 2. In certain examples, aspects of the operations of block 1715 may be performed by a collision manager as described with reference to FIGS. 4 and 5.

At block 1720 the UE 115 may decode at least one subframe of the downlink transmission after transmitting all subframes of the scheduled uplink transmission. In some examples, the downlink transmission may be decoded by identifying time-frequency resources allocated for the downlink transmission (or for a channel carrying the downlink transmission) in the control channel, and by identifying resources that carry reference signals for decoding the control channel. In some examples, information bits received on the time-frequency resources allocated for the downlink transmission (or channel carrying the downlink transmission) may be decoded based at least in part on the reference signals. The operations of block 1720 may be performed according to the techniques described with reference to FIGS. 1 and 2. In certain examples, aspects of the operations of block 1720 may be performed by a decoder as described with reference to FIG. 5.

Figure 18:
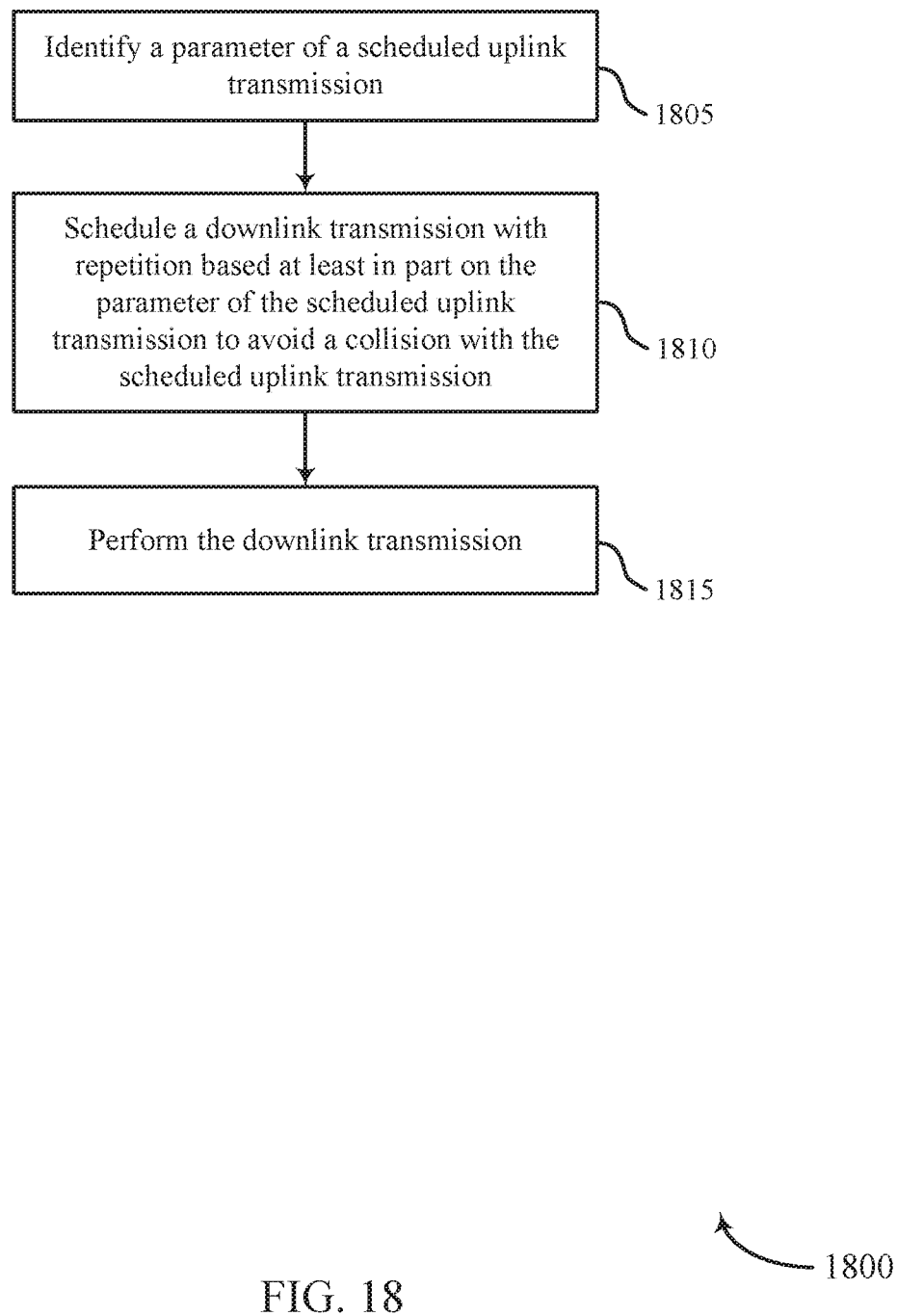

FIG. 18 shows a flowchart illustrating a method 1800 for handling collisions between uplink transmissions and downlink transmissions over a wireless spectrum in accordance with aspects of the present disclosure. The operations of method 1800 may be implemented by a base station 105 or its components as described herein. In some examples, the operations of method 1800 may be performed by a base station 105 as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may identify a parameter of a scheduled uplink transmission from a UE. In some examples, identifying the parameter of the scheduled uplink transmission may include at least one of: receiving the parameter from the UE, inferring the parameter from a transmission received from the UE, inferring the parameter from non-receipt of a transmission from the UE, or a combination thereof. In some examples, the parameter of the scheduled uplink transmission may include at least one of an identifier of at least one subframe in which the scheduled uplink transmission is transmitted, a number of subframes in which the scheduled uplink transmission is transmitted, a periodicity of the scheduled uplink transmission, a duration of the scheduled uplink transmission, or a combination thereof. The operations of block 1805 may be performed according to the techniques described with reference to FIGS. 1 and 2. In certain examples, aspects of the operations of block 1805 may be performed by an uplink manager as described with reference to FIGS. 8 and 9.

At block 1810 the base station 105 may schedule a downlink transmission with repetition in a plurality of subframes including a temporally first subset of one or more subframes. Scheduling the downlink transmission may include allocating a set of time-frequency resources for the downlink transmission. In some examples, the set of time-frequency resources may be resources of a channel (e.g., a data channel or a control channel). The downlink transmission may be scheduled in the temporally first subset of one or more subframes based at least in part on the parameter of the scheduled uplink transmission to avoid a collision with the scheduled uplink transmission. In some examples, the downlink transmission may be scheduled after the scheduled uplink transmission based at least in part on the parameter of the scheduled uplink transmission. In some examples, the scheduled uplink transmission may include at least one of a PUCCH, a PUSCH, or a combination thereof, and the downlink transmission may include at least one of a PDSCH, a MPDCCH, or a combination thereof. For example, the scheduled uplink transmission may include a PUCCH format 2 transmission, and the downlink transmission may include a PDSCH transmission. The operations of block 1810 may be performed according to the techniques described with reference to FIGS. 1 and 2. In certain examples, aspects of the operations of block 1810 may be performed by a transmission scheduler as described with reference to FIGS. 8 and 9.

At block 1815 the base station 105 may perform the downlink transmission according to the scheduling. The operations of block 1815 may be performed according to the techniques described with reference to FIGS. 1 and 2. In certain examples, aspects of the operations of block 1815 may be performed by a transmission manager as described with reference to FIGS. 8 and 9.

Figure 19:
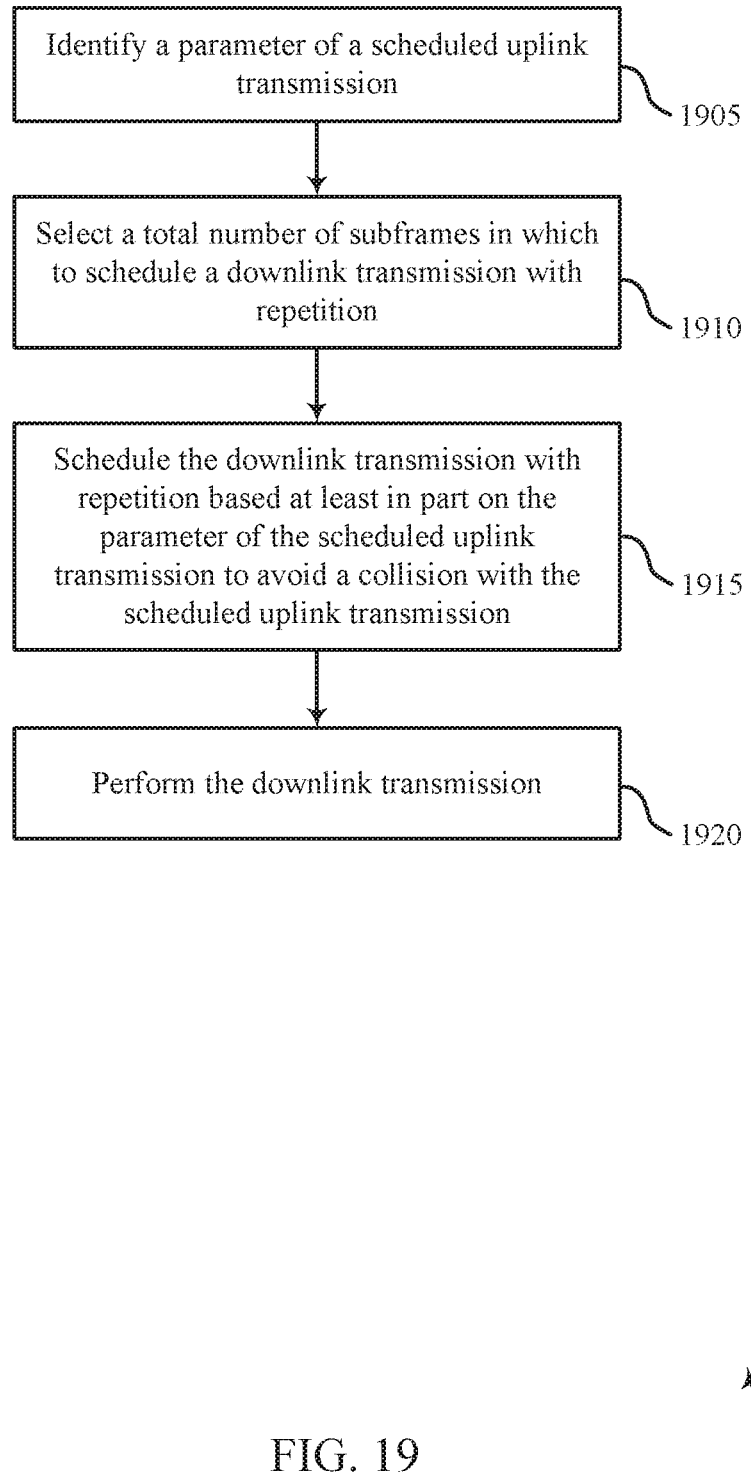

FIG. 19 shows a flowchart illustrating a method 1900 for handling collisions between uplink transmissions and downlink transmissions over a wireless spectrum in accordance with aspects of the present disclosure. The operations of method 1900 may be implemented by a base station 105 or its components as described herein. In some examples, the operations of method 1900 may be performed by a base station 105 as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may identify a parameter of a scheduled uplink transmission from a UE. In some examples, identifying the parameter of the scheduled uplink transmission may include at least one of: receiving the parameter from the UE, inferring the parameter from a transmission received from the UE, inferring the parameter from non-receipt of a transmission from the UE, or a combination thereof. In some examples, the parameter of the scheduled uplink transmission may include at least one of: an identifier of at least one subframe in which the scheduled uplink transmission is transmitted, a number of subframes in which the scheduled uplink transmission is transmitted, a periodicity of the scheduled uplink transmission, a duration of the scheduled uplink transmission, or a combination thereof. The operations of block 1905 may be performed according to the techniques described with reference to FIGS. 1 and 2. In certain examples, aspects of the operations of block 1905 may be performed by an uplink manager as described with reference to FIGS. 8 and 9.

At block 1910 the base station 105 may select a total number of subframes, in a plurality of subframes, in which to schedule a downlink transmission with repetition. The total number of subframes may be selected based at least in part on the parameter of the scheduled uplink transmission. The operations of block 1910 may be performed according to the techniques described with reference to FIGS. 1 and 2. In certain examples, aspects of the operations of block 1910 may be performed by a transmission scheduler as described with reference to FIGS. 8 and 9.

At block 1915 the base station 105 may schedule a downlink transmission with repetition in the plurality of subframes. Scheduling the downlink transmission may include allocating a set of time-frequency resources for the downlink transmission. In some examples, the set of time-frequency resources may be resources of a channel (e.g., a data channel or a control channel). The plurality of subframes may include a temporally first subset of one or more subframes. The downlink transmission may be scheduled in the temporally first subset of one or more subframes based at least in part on the parameter of the scheduled uplink transmission to avoid a collision with the scheduled uplink transmission. In some examples, the scheduled uplink transmission may include at least one of a PUCCH, a PUSCH, or a combination thereof, and the downlink transmission may include at least one of a PDSCH, a MPDCCH, or a combination thereof. For example, the scheduled uplink transmission may include a PUCCH format 2 transmission, and the downlink transmission may include a PDSCH transmission. The operations of block 1915 may be performed according to the techniques described with reference to FIGS. 1 and 2. In certain examples, aspects of the operations of block 1915 may be performed by the transmission scheduler as described with reference to FIGS. 8 and 9.

At block 1920 the base station 105 may perform the downlink transmission according to the scheduling. The operations of block 1920 may be performed according to the techniques described with reference to FIGS. 1 and 2. In certain examples, aspects of the operations of block 1920 may be performed by a transmission manager as described with reference to FIGS. 8 and 9.

Figure 20:
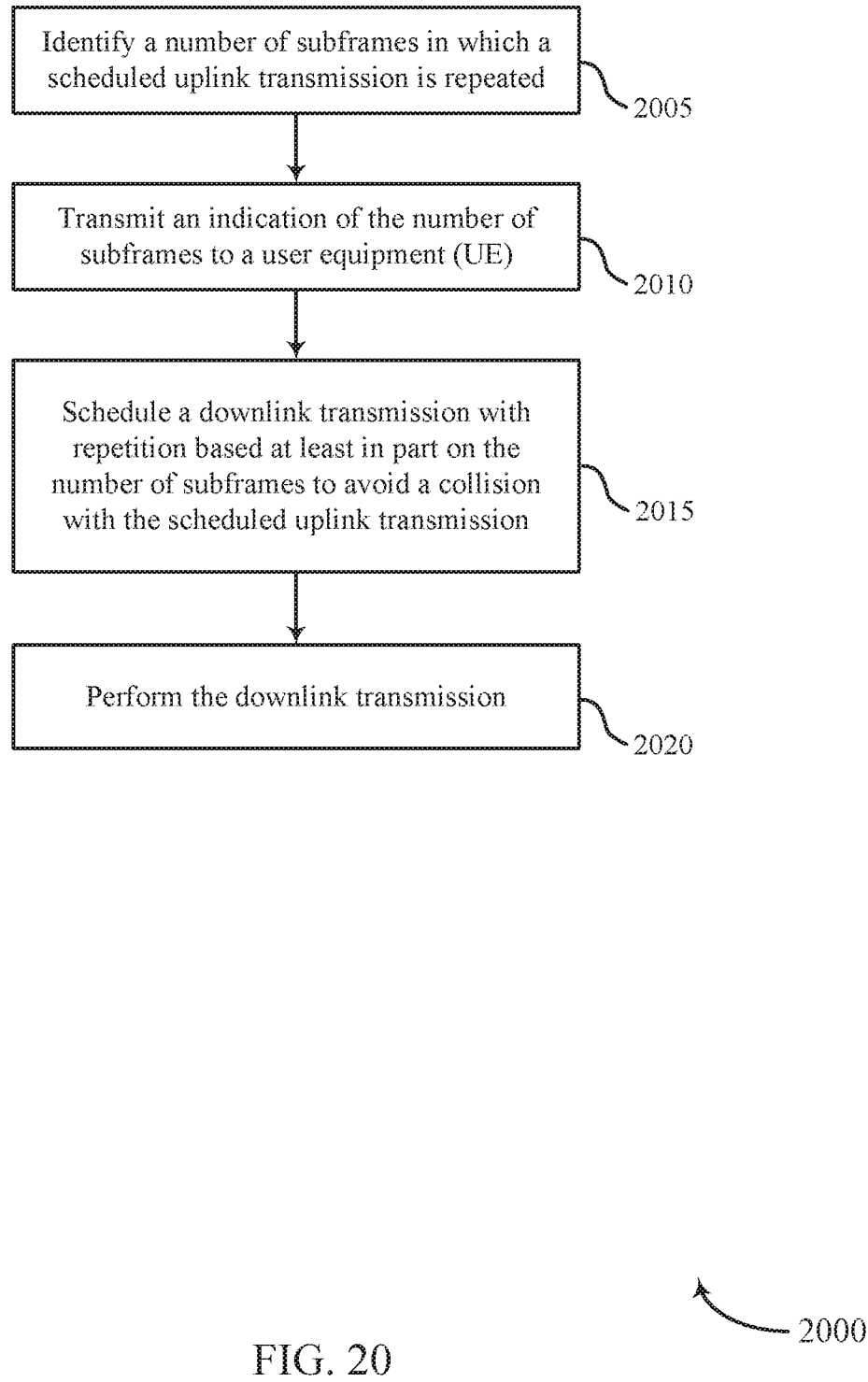

FIG. 20 shows a flowchart illustrating a method 2000 for handling collisions between uplink transmissions and downlink transmissions over a wireless spectrum in accordance with aspects of the present disclosure. The operations of method 2000 may be implemented by a base station 105 or its components as described herein. In some examples, the operations of method 2000 may be performed by a base station 105 as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may identify a parameter of a scheduled uplink transmission from a UE. In some examples, the parameter of the scheduled uplink transmission may include a number of subframes in which the scheduled uplink transmission is repeated. The operations of block 2005 may be performed according to the techniques described with reference to FIGS. 1 and 2. In certain examples, aspects of the operations of block 2005 may be performed by an uplink manager as described with reference to FIGS. 8 and 9.

At block 2010 the base station 105 may transmit an indication of the number of subframes to the UE (e.g., in an uplink grant). The operations of block 2010 may be performed according to the techniques described with reference to FIGS. 1 and 2. In certain examples, aspects of the operations of block 2010 may be performed by a transmission scheduler as described with reference to FIGS. 8 and 9.

At block 2015 the base station 105 may schedule a downlink transmission with repetition in a plurality of subframes including a temporally first subset of one or more subframes. Scheduling the downlink transmission may include allocating a set of time-frequency resources for the downlink transmission. In some examples, the set of time-frequency resources may be resources of a channel (e.g., a data channel or a control channel). The downlink transmission may be scheduled in the temporally first subset of one or more subframes based at least in part on the parameter of the scheduled uplink transmission to avoid a collision with the scheduled uplink transmission. In some examples, the scheduled uplink transmission may include at least one of a PUCCH, a PUSCH, or a combination thereof, and the downlink transmission may include at least one of a PDSCH, a MPDCCH, or a combination thereof. For example, the scheduled uplink transmission may include a PUCCH format 2 transmission, and the downlink transmission may include a PDSCH transmission. The operations of block 2015 may be performed according to the techniques described with reference to FIGS. 1 and 2. In certain examples, aspects of the operations of block 2015 may be performed by a transmission scheduler as described with reference to FIGS. 8 and 9.

At block 2020 the base station 105 may perform the downlink transmission according to the scheduling. The operations of block 2020 may be performed according to the techniques described with reference to FIGS. 1 and 2. In certain examples, aspects of the operations of block 2020 may be performed by a transmission manager as described with reference to FIGS. 8 and 9.

Figure 21:
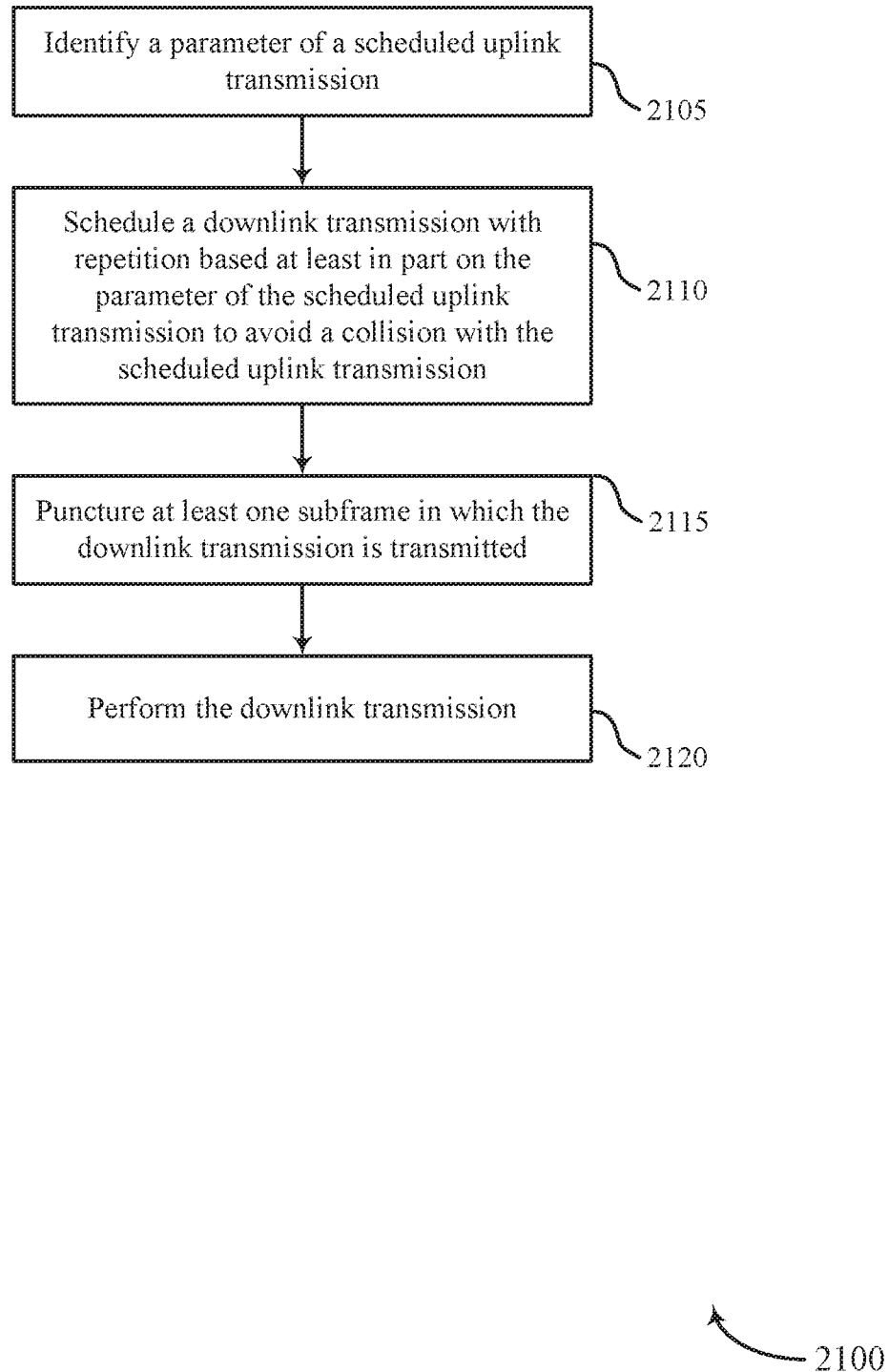

FIG. 21 shows a flowchart illustrating a method 2100 for handling collisions between uplink transmissions and downlink transmissions over a wireless spectrum in accordance with aspects of the present disclosure. The operations of method 2100 may be implemented by a base station 105 or its components as described herein. In some examples, the operations of method 2100 may be performed by a base station 105 as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may identify a parameter of a scheduled uplink transmission from a UE. In some examples, identifying the parameter of the scheduled uplink transmission may include at least one of: receiving the parameter from the UE, inferring the parameter from a transmission received from the UE, inferring the parameter from non-receipt of a transmission from the UE, or a combination thereof. In some examples, the parameter of the scheduled uplink transmission may include at least one of: an identifier of at least one subframe in which the scheduled uplink transmission is transmitted, a number of subframes in which the scheduled uplink transmission is transmitted, a periodicity of the scheduled uplink transmission, a duration of the scheduled uplink transmission, or a combination thereof. The operations of block 2105 may be performed according to the techniques described with reference to FIGS. 1 and 2. In certain examples, aspects of the operations of block 2105 may be performed by an uplink manager as described with reference to FIGS. 8 and 9.

At block 2110 the base station 105 may schedule a downlink transmission with repetition in a plurality of subframes including a temporally first subset of one or more subframes. Scheduling the downlink transmission may include allocating a set of time-frequency resources for the downlink transmission. In some examples, the set of time-frequency resources may be resources of a channel (e.g., a data channel or a control channel). The downlink transmission may be scheduled in the temporally first subset of one or more subframes based at least in part on the parameter of the scheduled uplink transmission to avoid a collision with the scheduled uplink transmission. In some examples, the scheduled uplink transmission may include at least one of a PUCCH, a PUSCH, or a combination thereof, and the downlink transmission may include at least one of a PDSCH, a MPDCCH, or a combination thereof. For example, the scheduled uplink transmission may include a PUCCH format 2 transmission, and the downlink transmission may include a PDSCH transmission. The operations of block 2110 may be performed according to the techniques described with reference to FIGS. 1 and 2. In certain examples, aspects of the operations of block 2110 may be performed by a transmission scheduler as described with reference to FIGS. 8 and 9.

At block 2115 the base station 105 may puncture, based at least in part on the parameter of the scheduled uplink transmission, at least one subframe in which the downlink transmission with repetition is transmitted. The puncture may include refraining from transmitting the downlink transmission on subsets of predetermined resources within one or more subframes, so that the UE 115 may transmit the scheduled uplink transmission on the resources. The operations of block 2115 may be performed according to the techniques described with reference to FIGS. 1 and 2. In certain examples, aspects of the operations of block 2115 may be performed by a transmission manager as described with reference to FIGS. 8 and 9.

At block 2120 the base station 105 may perform the downlink transmission according to the scheduling. The operations of block 2120 may be performed according to the techniques described with reference to FIGS. 1 and 2. In certain examples, aspects of the operations of block 2120 may be performed by a transmission manager as described with reference to FIGS. 8 and 9.

It should be noted that the methods described above describe possible implementations, and that the operations and the steps may be rearranged or otherwise modified and that other implementations are possible. Furthermore, aspects from two or more of the methods may be combined. Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e,g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a control channel in a first subframe of a plurality of subframes, the control channel indicating a downlink transmission with repetition in the plurality of subframes;
    identifying whether a collision is set to occur between the downlink transmission with repetition and at least one of a scheduled uplink transmission or a guard frame for the scheduled uplink transmission, wherein the collision is set to occur within a fixed number of one or more subframes following the first subframe in which the control channel is received; and
    performing a collision management procedure based at least in part on identifying whether the collision is set to occur within the fixed number of one or more subframes, the collision management procedure comprising refraining from transmitting at least part of the scheduled uplink transmission, refraining from decoding at least part of the downlink transmission, or a combination thereof.

2. The method of claim 1, further comprising:
    determining the collision is not set to occur, between the downlink transmission and the scheduled uplink transmission, within the fixed number of one or more subframes following the first subframe in which the control channel is received;
    wherein performing the collision management procedure comprises decoding all of the plurality of subframes of the downlink transmission and refraining from transmitting the scheduled uplink transmission based at least in part on the determination.

3. The method of claim 1, further comprising:
    determining a first set of subframes of the scheduled uplink transmission is set to collide with subframes utilized for the downlink transmission that are prior to the fixed number of one or more subframes following the first subframe in which the control channel is received; and
    determining a second set of subframes of the scheduled uplink transmission is set to collide with the subframes utilized for the downlink transmission subsequent to the fixed number of one or more subframes following the first subframe in which the control channel is received,
    wherein performing the collision management procedure comprises decoding the downlink transmission received on the second set of subframes and refraining from transmitting at least part of the scheduled uplink transmission on the second set of subframes.

4. The method of claim 1, further comprising:
    determining the collision is set to occur between the downlink transmission and the scheduled uplink transmission within a set of one or more subframes following the first subframe in which the control channel is received.

5. The method of claim 4, wherein performing the collision management procedure comprises transmitting the scheduled uplink transmission and refraining from decoding the downlink transmission.

6. The method of claim 4, wherein performing the collision management procedure comprises transmitting the scheduled uplink transmission and refraining from decoding at least part of the downlink transmission.

7. The method of claim 4, wherein performing the collision management procedure comprises refraining from transmitting at least part of the scheduled uplink transmission and refraining from decoding at least part of the downlink transmission.

8. The method of claim 4, further comprising:
    prioritizing the scheduled uplink transmission after identifying the collision, to transmit the scheduled uplink transmission before decoding the downlink transmission in any subframe; and
    refraining from decoding the downlink transmission in any subframe in which the scheduled uplink transmission is transmitted.

9. The method of claim 4, further comprising:
    refraining from decoding any subframe of the downlink transmission until after transmitting all subframes of the scheduled uplink transmission; and
    decoding at least one subframe of the downlink transmission after transmitting all subframes of the scheduled uplink transmission.

10. The method of claim 1, wherein the scheduled uplink transmission comprises at least one of a Physical Uplink Control Channel (PUCCH), a Physical Uplink Shared Channel (PUSCH), or a combination thereof, and the downlink transmission comprises at least one of a Physical Downlink Shared Channel (PDSCH), a Machine type communication Physical Downlink Control Channel (MPDCCH), or a combination thereof.

11. A method for wireless communication at a base station, comprising:
    identifying a parameter of a scheduled uplink transmission from a user equipment (UE);
    scheduling a downlink transmission with repetition in a plurality of subframes based at least in part on the parameter of the scheduled uplink transmission, the downlink transmission set to collide with at least one of the scheduled uplink transmission or a guard frame for the scheduled uplink transmission in at least one subframe of the plurality of subframes, wherein a fixed number of subframes of the downlink transmission are set to collide with at least one of the scheduled uplink transmission or the guard frame for the scheduled uplink transmission, the fixed number of subframes comprising at least a beginning portion of the downlink transmission; and performing a collision management procedure based at least in part on the fixed number of subframes of the downlink transmission being set to collide with at least one of the scheduled uplink transmission or the guard frame for the scheduled uplink transmission, wherein performing the collision management procedure comprises rescheduling at least part of the downlink transmission.

12. The method of claim 11, wherein performing the collision management procedure comprises puncturing, based at least in part on the parameter of the scheduled uplink transmission, at least one subframe in which the downlink transmission is transmitted.

13. The method of claim 11, wherein performing the collision management procedure comprises rescheduling the downlink transmission such that the scheduled uplink transmission is not set to collide with the fixed number of subframes of at least the beginning portion of the downlink transmission.

14. The method of claim 11, wherein the parameter of the scheduled uplink transmission comprises at least one of: an identifier of at least one subframe in which the scheduled uplink transmission is transmitted, a number of subframes in which the scheduled uplink transmission is transmitted, a periodicity of the scheduled uplink transmission, a duration of the scheduled uplink transmission, or a combination thereof.

15. The method of claim 11, wherein the scheduled uplink transmission comprises at least one of a Physical Uplink Control Channel (PUCCH), a Physical Uplink Shared Channel (PUSCH), or a combination thereof, and the downlink transmission comprises at least one of a Physical Downlink Shared Channel (PDSCH), a Machine type communication Physical Downlink Control Channel (MPDCCH), or a combination thereof.

16. An apparatus for wireless communication at a user equipment (UE), comprising:
a processor;
memory in electronic communication with the processor; and
instructions stored in the memory and operable, when executed by the processor, to cause the apparatus to:
receive a control channel in a first subframe of a plurality of subframes, the control channel indicating a downlink transmission with repetition in the plurality of subframes;
identify whether a collision is set to occur between the downlink transmission with repetition and at least one of a scheduled uplink transmission or a guard frame for the scheduled uplink transmission, wherein the collision is set to occur within a fixed number of one or more subframes following the first subframe in which the control channel is received; and
perform a collision management procedure based at least in part on identifying whether the collision is set to occur within the fixed number of one or more subframes, the collision management procedure comprising refraining from transmitting at least part of the scheduled uplink transmission, refraining from decoding at least part of the downlink transmission, or a combination thereof.

17. The apparatus of claim 16, wherein the instructions, when executed by the processor, further cause the apparatus to:
determine the collision is not set to occur, between the downlink transmission and the scheduled uplink transmission, within the fixed number of one or more subframes following the first subframe in which the control channel is received;
wherein performing the collision management procedure comprises decoding all of the plurality of subframes of the downlink transmission and refraining from transmitting the scheduled uplink transmission based at least in part on the determination.

18. The apparatus of claim 16, wherein the instructions, when executed by the processor, further cause the apparatus to:
determine a first set of subframes of the scheduled uplink transmission is set to collide with subframes utilized for the downlink transmission that are prior to the fixed number of one or more subframes following the first subframe in which the control channel is received; and
determine a second set of subframes of the scheduled uplink transmission is set to collide with the subframes utilized for the downlink transmission subsequent to the fixed number of one or more subframes following the first subframe in which the control channel is received,
wherein performing the collision management procedure comprises decoding the downlink transmission received on the second set of subframes and refraining from transmitting at least part of the scheduled uplink transmission on the second set of subframes.

19. The apparatus of claim 16, wherein the instructions, when executed by the processor, further cause the apparatus to:
determine the collision is set to occur between the downlink transmission and the scheduled uplink transmission within a set of one or more subframes following the first subframe in which the control channel is received.

20. The apparatus of claim 19, wherein performing the collision management procedure comprises transmitting the scheduled uplink transmission and refraining from decoding the downlink transmission.

21. The apparatus of claim 19, wherein performing the collision management procedure comprises transmitting the scheduled uplink transmission and refraining from decoding at least part of the downlink transmission.

22. The apparatus of claim 19, wherein performing the collision management procedure comprises refraining from transmitting at least part of the scheduled uplink transmission and refraining from decoding at least part of the downlink transmission.

23. The apparatus of claim 19, wherein the instructions, when executed by the processor, further cause the apparatus to:
prioritize the scheduled uplink transmission after identifying the collision, to transmit the scheduled uplink transmission before decoding the downlink transmission in any subframe; and
refrain from decoding the downlink transmission in any subframe in which the scheduled uplink transmission is transmitted.

24. The apparatus of claim 19, wherein the instructions, when executed by the processor, further cause the apparatus to:
refrain from decoding any subframe of the downlink transmission until after transmitting all subframes of the scheduled uplink transmission; and
decode at least one subframe of the downlink transmission after transmitting all subframes of the scheduled uplink transmission.

25. The apparatus of claim 16, wherein the scheduled uplink transmission comprises at least one of a Physical Uplink Control Channel (PUCCH), a Physical Uplink Shared Channel (PUSCH), or a combination thereof, and the downlink transmission comprises at least one of a Physical Downlink Shared Channel (PDSCH), a Machine type communication Physical Downlink Control Channel (MPDCCH), or a combination thereof.

26. An apparatus for wireless communication at a base station (BS), comprising:
a processor;
memory in electronic communication with the processor; and
instructions stored in the memory and operable, when executed by the processor, to cause the apparatus to:
identify a parameter of a scheduled uplink transmission from a user equipment (UE);
schedule a downlink transmission with repetition in a plurality of subframes based at least in part on the parameter of the scheduled uplink transmission, the downlink transmission set to collide with at least one of the scheduled uplink transmission or a guard frame for the scheduled uplink transmission in at least one subframe of the plurality of subframes, wherein a fixed number of subframes of the downlink transmission are set to collide with at least one of the scheduled uplink transmission or the guard frame for the scheduled uplink transmission, the fixed number of subframes comprising at least a beginning portion of the downlink transmission; and
perform a collision management procedure based at least in part on the fixed number of subframes of the downlink transmission being set to collide with at least one of the scheduled uplink transmission or the guard frame for the scheduled uplink transmission, wherein performing the collision management procedure comprises rescheduling at least part of the downlink transmission.

27. The apparatus of claim 26, wherein performing the collision management procedure comprises puncturing, based at least in part on the parameter of the scheduled uplink transmission, at least one subframe in which the downlink transmission is transmitted.

28. The apparatus of claim 26, wherein performing the collision management procedure comprises rescheduling the downlink transmission such that the scheduled uplink transmission is not set to collide with the fixed number of subframes of at least the beginning portion of the downlink transmission.

29. The apparatus of claim 26, wherein the parameter of the scheduled uplink transmission comprises at least one of: an identifier of at least one subframe in which the scheduled uplink transmission is transmitted, a number of subframes in which the scheduled uplink transmission is transmitted, a periodicity of the scheduled uplink transmission, a duration of the scheduled uplink transmission, or a combination thereof.

30. The apparatus of claim 26, wherein the scheduled uplink transmission comprises at least one of a Physical Uplink Control Channel (PUCCH), a Physical Uplink Shared Channel (PUSCH), or a combination thereof, and the downlink transmission comprises at least one of a Physical Downlink Shared Channel (PDSCH), a Machine type communication Physical Downlink Control Channel (MPDCCH), or a combination thereof.

* * * * *